(12) United States Patent
Cox et al.

(10) Patent No.: US 11,048,884 B2
(45) Date of Patent: Jun. 29, 2021

(54) WORD EMBEDDINGS AND VIRTUAL TERMS

(71) Applicant: SAS Institute Inc., Cary, NC (US)

(72) Inventors: James Allen Cox, Cary, NC (US); Russell Albright, Spring Lake, MI (US); Saratendu Sethi, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/060,198

(22) Filed: Oct. 1, 2020

(65) Prior Publication Data
US 2021/0027024 A1    Jan. 28, 2021

Related U.S. Application Data

(63) Continuation of application No. 16/838,221, filed on Apr. 2, 2020, now Pat. No. 10,860,809.
(Continued)

(51) Int. Cl.
*G06F 40/44* (2020.01)
*G06F 16/903* (2019.01)
(Continued)

(52) U.S. Cl.
CPC ........ *G06F 40/44* (2020.01); *G06F 16/90344* (2019.01); *G06F 16/90348* (2019.01);
(Continued)

(58) Field of Classification Search
CPC ........ G06F 40/284; G06F 40/30; G06F 40/44; G06F 16/90344
See application file for complete search history.

(56) References Cited

U.S. PATENT DOCUMENTS 6,941,321 B2   9/2005  Schuetze et al.
8,359,282 B2   1/2013  Bai et al.
(Continued)

OTHER PUBLICATIONS

Schwartz, Roy, et al., "Symmetric Pattern Based Word Embeddings for Improved Word Similarity Prediction", Proceedings of the 19th Conference on Computational Language Learning, pp. 258-267 (Beijing, China, Jul. 30-31, 2015).
(Continued)

*Primary Examiner* — Bryan S Blankenagel
(74) *Attorney, Agent, or Firm* — Coats + Bennett, PLLC

(57) ABSTRACT

A computing system receives a collection comprising multiple sets of ordered terms, including a first set. The system generates a dataset indicating an association between each pair of terms within a same set of the collection by generating co-occurrence score(s) for the first set. The system generates computed probabilities based on the co-occurrence score(s) for the first set. The computed probabilities indicate a likelihood that one term in a given pair of terms of the collection appears in a given set of the collection given that another term in the given pair of terms of the collection occurs. The system smoothes the computed probabilities by adding one or more random observations. The system generates one or more association indications for the first set based on the smoothed computed probabilities. The system outputs an indication of the dataset. Additionally, or alternatively, based on association measure(s), the system generates a virtual term.

30 Claims, 30 Drawing Sheets

Related U.S. Application Data

(60) Provisional application No. 62/831,693, filed on Apr. 9, 2019.

(51) Int. Cl.
    *G06F 40/30*         (2020.01)
    *G06F 40/247*      (2020.01)
    *G06F 40/284*      (2020.01)

(52) U.S. Cl.
    CPC .......... *G06F 40/247* (2020.01); *G06F 40/284* (2020.01); *G06F 40/30* (2020.01)

(56) References Cited

U.S. PATENT DOCUMENTS

| | | |
|---|---|---|
| 8,874,432 B2 | 10/2014 | Qi et al. |
| 9,116,985 B2 | 8/2015 | Mills et al. |
| 9,607,616 B2 | 3/2017 | Watanabe et al. |
| 9,734,290 B2 | 8/2017 | Srinivas et al. |
| 9,977,778 B1 | 5/2018 | Perez et al. |
| 10,210,860 B1 | 2/2019 | Ward et al. |
| 10,212,044 B2 | 2/2019 | Mermoud |
| 10,262,654 B2 | 4/2019 | Hakkani-Tur et al. |
| 2003/0036233 A1* | 2/2003 | Chen ................. H01L 21/28518 438/261 |
| 2007/0067157 A1* | 3/2007 | Kaku .................... G06F 40/289 704/10 |
| 2012/0166450 A1* | 6/2012 | Choi ................. G06F 16/24534 707/748 |
| 2012/0203660 A1 | 8/2012 | Moritz et al. |
| 2014/0250376 A1* | 9/2014 | Jojic ...................... G06F 16/34 715/273 |
| 2015/0134666 A1* | 5/2015 | Gattiker .............. G06F 16/3338 707/739 |
| 2015/0317390 A1 | 11/2015 | Mills et al. |
| 2016/0259847 A1 | 9/2016 | Fliri |
| 2018/0060437 A1 | 3/2018 | Gao et al. |
| 2018/0125003 A1 | 5/2018 | Wu et al. |
| 2018/0157644 A1 | 6/2018 | Mandt et al. |
| 2018/0253496 A1 | 9/2018 | Natchu |
| 2018/0322295 A1* | 11/2018 | Bordawekar ....... G06F 21/6245 |
| 2019/0155902 A1 | 5/2019 | Kataoka et al. |
| 2019/0286702 A1 | 9/2019 | Kataoka |
| 2019/0286716 A1 | 9/2019 | Lin et al. |
| 2020/0027034 A1 | 1/2020 | Banerjee et al. |
| 2020/0104733 A1* | 4/2020 | Bart ......................... G06N 3/02 |
| 2020/0134263 A1 | 4/2020 | Oh et al. |

OTHER PUBLICATIONS

"Text Utilities Action Set: Syntax", SAS Institute Inc. (Aug. 30, 2018).

"Pointwise mutual information", Wikipedia (Apr. 14, 2019).

Church, Kenneth Ward, et al., "Word Association Norms, Mutual Information, and Lexicography", Computational Linguistics, vol. 16, No. 1, pp. 22-29 (Mar. 1990).

"Mutual information", Wikipedia (Apr. 15, 2019).

Francois, Role, et al., "Handling the Impact of Low Frequency Events on Co-occurrence based Measures of Word Similarity—A Case Study of Pointwise Mutual Information" (Jan. 2011).

Carroll, Matt, et al., "How contexts and follow-up intents work", Dialogflow Developer Relations (Mar. 7, 2018).

Gutmann, Michael, et al., "Noise-contrastive estimation: A new estimation principle for unnormalized statistical models", Proceedings of the 13th International Conference on Artificial Intelligence and Statistics (AISTATS), vol. 9 of JMLR: W&CP 9 (Chia Laguna Resort, Sardinia, Italy, 2010).

"G-test", Wikipedia (Feb. 18, 2019).

Pennington, Jeffrey, et al., "GloVe: Global Vectors for Word Representation", Proceedings of the 2014 Conference on Empirical Methods in Natural Language Processing (EMNLP), pp. 1532-1543, https://www.aclweb.org/anthology/D14-1162 (Oct. 2014).

Bullinaria, John A., et al., "Extracting Semantic Representations from Word Co-occurrence Statistics: Stop-lists, Stemminkg and SVD", Behavior Research Methods, pp. 1-25 (2012).

Bullinaria, John A., et al., "Extracting Semantic Representations from Word Co-occurrence Statistics: A Computational Study", Behavior Research Methods, pp. 1-26 (2007).

"Additive Smoothing", Wikipedia (Apr. 22, 2019).

Levy, Omar, et al., "Neural Word Embedding as Implicit Matrix Factorization", Advances in Neural Information Processing Systems 27 (NIPS 2014), pp. 1-9 (2014).

Mikolov, Tomas, et al., "Distributed Representations of Words and Phrases and their Compositionality", pp. 1-9, https://arxiv.org/pdf/1310.4546.pdf (Oct. 26, 2013).

Arora, Sanjeev, et al., "A Simple but Tough-to-Beat Baseline for Sentence Embeddings", published as conference paper at ICLR 2017, pp. 1-16 (2017).

Subramanian, Sandeep, et al., "Learning General Purpose Distributed Sentence Representations Via Large Scale Multi-Task Learning", published as conference paper at ICLR 2018, pp. 1-16 (2018).

Devlin, Jacob, et al., "BERT: Pre-training of Deep Bidirectional Transformers for Language Understanding", NAACL-HLT 2019, 14 pages (2019).

Conneau, Alexis, et al., "Supervised Learning of Universal Sentence Representations from Natural Language Inference Data", EMNLP 2017, 12 pages (2017).

Jernite, Yacine, et al., "Discourse-Based Objectives for Fast Unsupervised Sentence Representation Learning", Cornell University, 3 pages (Apr. 23, 2017).

Mikolov, Tomas, et al., "Efficient Estimation of Word Representations in Vector Space", Cornell University, 12 pages (Sep. 7, 2017).

Lee, Choon Hwan, et al., "An Algorithm for Weighted Bilinear Regression", Commun. Statist.—Simula., vol. 26, No. 2, pp. 791-804 (1997).

Gupta, Shashank, "Word Embeddings in NLP and its Applications", https://medium.com/aimarketingassociation/word-embeddings-in-nlp-and-its-applications-5fc147950777(Jan. 2, 2019).

"Word embedding", Wikipedia (Mar. 26, 2019).

\* cited by examiner

Text Information
1500
The cat really liked that cat a lot! The cat didn't like that cat very much.

*FIG. 15A*

Dictionary

| word | term id |
|---|---|
| the | 0 |
| cat | 1 |
| really | 2 |
| liked \|\| like | 3 |
| that | 4 |
| a | 5 |
| lot | 6 |
| do \|\| does \|\| did | 7 |
| n't | 8 |
| very | 9 |
| much | 10 |

*FIG. 15B*

Offset Table

| word | token # | sent # | doc # |
|---|---|---|---|
| The | 0 | 1 | 1 |
| cat | 1 | 1 | 1 |
| really | 2 | 1 | 1 |
| liked | 3 | 1 | 1 |
| that | 4 | 1 | 1 |
| cat | 5 | 1 | 1 |
| a | 6 | 1 | 1 |
| lot | 7 | 1 | 1 |
| The | 8 | 2 | 1 |
| cat | 9 | 2 | 1 |
| didn't | 10 | 2 | 1 |
| like | 11 | 2 | 1 |
| that | 12 | 2 | 1 |
| cat | 13 | 2 | 1 |
| very | 14 | 2 | 1 |
| much | 15 | 2 | 1 |

*FIG. 15C*

Text Information
1500

The cat really liked that cat a lot! The cat didn't like that cat very much.

Term-by-Term Table 1600

| | | NULL | The | cat | really | liked | that | a | lot | did | n't | very | much |
|---|---|---|---|---|---|---|---|---|---|---|---|---|---|
| | | -1 | 0 | 1 | 2 | 3 | 4 | 5 | 6 | 7 | 8 | 9 | 10 |
| The | 0 | 2 | | | | | | | | | | | |
| cat | 1 | 2 | 2 | | | | | | | | | | |
| really | 2 | 1 | 1 | 1 | | | | | | | | | |
| liked | 3 | 2 | | 2 | 2 | | | | | | | | |
| that | 4 | 2 | | 2 | 2 | 2 | | | | | | | |
| a | 5 | 1 | | 1 | 1* | 1 | 1 | | | | | | |
| lot | 6 | 1 | | | 1* | | | 1 | | | | | |
| did | 7 | 1 | | 1 | | 1 | 1 | | | 1 | | | |
| n't | 8 | 1 | | | 1* | | | | | 1 | | | |
| very | 9 | 1 | | 1 | 1* | | | | | | 1 | 1 | |
| much | 10 | 1 | | 1 | 1* | | | | | | | 1 | 1 |

Node Input

| | 1632 | 1633 | 1634 | 1635 |
|---|---|---|---|---|
| term 1 | term 2 | sent # | doc # | distance |
| that | NULL | 1 | 1 | 0 |
| that | cat | 1 | 1 | 1 |
| that | a | 1 | 1 | 2 |
| that | lot | 1 | 1 | 3 |
| that | NULL | 2 | 1 | 0 |
| that | cat | 2 | 1 | 1 |
| that | very | 2 | 1 | 2 |

1631 → term 1 column; 1630 → table

FIG. 16B

Weighted Co-occurrence Scores

| | NULL | The | cat | really | liked | that | a | lot | I | did | n't | very | much |
|---|---|---|---|---|---|---|---|---|---|---|---|---|---|
| | | 0 | 1 | 2 | 3 | 4 | 5 | 6 | 7 | 8 | 9 | 10 |
| NULL | -1 | | | | | | | | | | | | |
| that | 4 | | | | | | 0.71 | 0.58 | | | | 0.71 | 0.58 |

| | 0 | 1 | 2 | 3 | 4 | 5 | 6 | 7 | 8 | 9 | 10 |
|---|---|---|---|---|---|---|---|---|---|---|---|
| | 0.5 | 0.5 | 0.25 | 0.5 | 0.5 | 0.25 | 0.25 | 0.25 | 0.25 | 0.25 | 0.25 |

FIG. 17A  ← 1700

$P^{\wedge}(i,j) =$

| | 0 | 1 | 2 | 3 | 4 | 5 | 6 | 7 | 8 | 9 | 10 |
|---|---|---|---|---|---|---|---|---|---|---|---|
| 0 |  | 0.417 | 0.198 |  |  |  |  |  |  |  |  |
| 1 | 0.417 |  | 0.198 | 0.417 | 0.417 |  |  | 0.198 |  |  |  |
| 2 | 0.198 | 0.198 |  | 0.198 | 0.198 | 0.198 | 0.198 |  |  |  |  |
| 3 | 0.417 |  | 0.198 |  | 0.417 | 0.198 | 0.156 |  |  |  |  |
| 4 | 0.417 | 0.417 | 0.198 | 0.417 |  | 0.198 | 0.198 |  |  |  |  |
| 5 |  | 0.198 | 0.156 |  | 0.198 |  | 0.156 |  |  |  |  |
| 6 |  | 0.198 | 0.156 |  | 0.198 | 0.156 |  |  |  |  |  |
| 7 | 0.198 | 0.198 |  |  | 0.198 | 0.156 |  |  | 0.156 |  |  |
| 8 |  | 0.198 |  | 0.198 |  | 0.156 |  | 0.156 |  |  |  |
| 9 |  | 0.198 |  | 0.198 |  |  |  |  | 0.156 |  | 0.156 |
| 10 |  | 0.198 |  | 0.198 |  |  |  | 0.156 |  | 0.156 |  |

| word 1 | word 2 | count word 1 (Xi) | (Xj) | count of co-occurrences (Mij) | P(i) | P(j) | Pij | PMI | NPMI | P^(i\|j) | P^(j\|i) | p^(i,j) | PMI^ | alt NPMI^ | NPMI^(Xij=0) | termcorr r_0_2 | termcorr _0_2 raised to power | alt. p^(i,j) |
|---|---|---|---|---|---|---|---|---|---|---|---|---|---|---|---|---|---|---|
| puerto | rico | 1938 | 1311 | 1159 | 0.056% | 0.038% | 0.03338% | 10.63 | 0.9204 | 87.74% | 59.50% | 0.03317% | 10.62 | 0.9189 | 0.7205 | 1.1984 | 1.721 | 0.03338% |
| hong | kong | 2438 | 2694 | 2205 | 0.070% | 0.078% | 0.06350% | 10.19 | 0.9591 | 81.55% | 90.07% | 0.06326% | 10.18 | 0.9581 | 0.6996 | 1.2585 | 1.993 | 0.06350% |
| los | angeles | 3501 | 2808 | 2791 | 0.101% | 0.081% | 0.08038% | 9.95 | 0.9673 | 99.04% | 79.49% | 0.08012% | 9.94 | 0.9665 | 0.5108 | 1.4557 | 3.084 | 0.08038% |
| carbon | dioxide | 4265 | 1353 | 1032 | 0.123% | 0.039% | 0.02972% | 9.28 | 0.7919 | 75.72% | 24.14% | 0.02958% | 9.27 | 0.7909 | 0.5195 | 1.2713 | 2.055 | 0.02972% |
| prize | laureate | 5131 | 1676 | 1210 | 0.148% | 0.048% | 0.03485% | 8.93 | 0.7776 | 71.77% | 23.54% | 0.03471% | 8.93 | 0.7768 | 0.5126 | 1.2641 | 2.020 | 0.03485% |
| san | francisco | 5237 | 2477 | 1779 | 0.151% | 0.071% | 0.05124% | 8.90 | 0.6138 | 71.53% | 33.91% | 0.05108% | 8.89 | 0.8131 | 0.5053 | 1.3078 | 2.237 | 0.05124% |
| nobel | prize | 4098 | 5131 | 2498 | 0.118% | 0.148% | 0.07194% | 8.69 | 0.8321 | 48.59% | 60.81% | 0.07179% | 8.69 | 0.8316 | 0.4964 | 1.3352 | 2.380 | 0.07194% |
| ice | hockey | 5607 | 3002 | 1933 | 0.161% | 0.086% | 0.05567% | 8.64 | 0.7991 | 64.18% | 34.41% | 0.05553% | 8.64 | 0.7985 | 0.5005 | 1.2980 | 2.187 | 0.05567% |
| star | trek | 8264 | 1594 | 1489 | 0.238% | 0.046% | 0.04288% | 8.62 | 0.7702 | 92.83% | 18.00% | 0.04272% | 8.61 | 0.7694 | 0.5050 | 1.2644 | 2.021 | 0.04288% |
| car | driver | 5578 | 2749 | 1384 | 0.161% | 0.079% | 0.03986% | 8.29 | 0.7343 | 50.16% | 24.77% | 0.03975% | 8.29 | 0.7337 | 0.5022 | 1.2314 | 1.867 | 0.03986% |
| it | the | 283891 | 3293296 | 3347 | 8.176% | 94.847% | 0.09639% | -6.33 | -0.6318 | 0.10% | 1.18% | 0.09654% | -6.33 | -0.6317 | 0.1597 | 0.2085 | 0.009 | 0.09642% |
| are | of | 234453 | 1761436 | 1019 | 6.752% | 50.729% | 0.02935% | -6.87 | -0.5852 | 0.06% | 0.44% | 0.02943% | -6.86 | -0.5850 | 0.2005 | 0.2144 | 0.010 | 0.02936% |
| this | the | 199852 | 3293296 | 1211 | 5.757% | 94.847% | 0.03488% | -7.29 | -0.6348 | 0.04% | 0.61% | 0.03502% | -7.28 | -0.6346 | 0.1777 | 0.1877 | 0.007 | 0.03489% |
| is | of | 565679 | 1761436 | 1562 | 16.292% | 50.729% | 0.04499% | -7.52 | -0.6765 | 0.09% | 0.28% | 0.04508% | -7.52 | -0.6764 | 0.1564 | 0.1672 | 0.005 | 0.04501% |
| and | of | 1375396 | 1761436 | 2949 | 39.611% | 50.729% | 0.08493% | -7.89 | -0.7731 | 0.17% | 0.21% | 0.08506% | -7.88 | -0.7730 | 0.1066 | 0.1204 | 0.002 | 0.08499% |
| a | and | 984442 | 1375396 | 1457 | 28.352% | 39.611% | 0.04196% | -8.06 | -0.7188 | 0.11% | 0.15% | 0.04206% | -8.06 | -0.7187 | 0.1398 | 0.1414 | 0.003 | 0.04199% |
| in | and | 1187652 | 1375396 | 1537 | 34.204% | 39.611% | 0.04427% | -8.26 | -0.7412 | 0.11% | 0.13% | 0.04437% | -8.25 | -0.7411 | 0.1294 | 0.1295 | 0.002 | 0.04430% |
| to | and | 1025659 | 1375396 | 1286 | 29.539% | 39.611% | 0.03704% | -8.30 | -0.7285 | 0.09% | 0.13% | 0.03714% | -8.30 | -0.7284 | 0.1376 | 0.1341 | 0.002 | 0.03707% |
| to | in | 1025659 | 1187652 | 1066 | 29.539% | 34.204% | 0.03070% | -8.36 | -0.7166 | 0.09% | 0.10% | 0.03079% | -8.36 | -0.7165 | 0.1456 | 0.1379 | 0.003 | 0.03073% |
| of | and | 1761436 | 1375396 | 1190 | 50.729% | 39.611% | 0.03427% | -9.20 | -0.7989 | 0.09% | 0.07% | 0.03440% | -9.19 | -0.7988 | 0.1066 | 0.0946 | 0.001 | 0.03433% |

FIG. 18

| word 1 | word 2 | count word 1 (Xi) | (Xj) | count of co-occurrences (Xij) | P(i) | P(j) | Pij | PMI | NPMI | p^(i\|j) | p^(j\|i) | p^(i,j) | PMI^ | alt NPMI^ | NPMI^(Xij=0) | termcorr_0_2 | termcorr_0_2 raised to power | alt. p^(i,j) |
|---|---|---|---|---|---|---|---|---|---|---|---|---|---|---|---|---|---|---|
| word 3 | word 5 | 10 | 10 | 10 | 0.000% | 0.000% | 0.00029% | 18.41 | 1.0000 | 50.00% | 50.00% | 0.00014% | 17.41 | 0.8969 | 0.6434 | 1.2536 | 1.970 | 0.00029% |
| word 1 | word 2 | 100 | 100 | 100 | 0.003% | 0.003% | 0.00288% | 15.08 | 1.0000 | 90.91% | 90.91% | 0.00262% | 14.95 | 0.9819 | 0.6069 | 1.3751 | 2.600 | 0.00288% |
| word 6 | word 7 | 1000 | 1000 | 1000 | 0.029% | 0.029% | 0.02880% | 11.76 | 1.0000 | 99.01% | 99.01% | 0.02851% | 11.75 | 0.9976 | 0.5478 | 1.4498 | 3.047 | 0.02880% |
| word 1 | word 3 | 100 | 10 | 10 | 0.003% | 0.000% | 0.00029% | 15.08 | 0.8195 | 50.00% | 9.09% | 0.00020% | 14.58 | 0.7709 | 0.6214 | 1.1495 | 1.519 | 0.00029% |
| word 6 | word 4 | 1000 | 100 | 100 | 0.029% | 0.003% | 0.00288% | 11.76 | 0.7798 | 90.91% | 9.90% | 0.00273% | 11.69 | 0.7710 | 0.5787 | 1.1923 | 1.695 | 0.00288% |
| word 9 | word 6 | 10000 | 1000 | 1000 | 0.288% | 0.029% | 0.02880% | 8.44 | 0.7176 | 99.01% | 9.99% | 0.02864% | 8.43 | 0.7164 | 0.5099 | 1.2066 | 1.756 | 0.02880% |
| word 1 | word 4 | 100 | 100 | 1 | 0.003% | 0.003% | 0.00003% | 8.44 | 0.3884 | 0.91% | 0.91% | 0.00003% | 8.30 | 0.3797 | 0.6069 | 0.7729 | 0.462 | 0.00003% |
| word 1 | word 5 | 100 | 10 | 1 | 0.003% | 0.000% | 0.00003% | 11.76 | 0.5413 | 5.00% | 0.91% | 0.00002% | 11.26 | 0.5063 | 0.6214 | 0.8849 | 0.693 | 0.00003% |
| word 3 | word 8 | 10 | 10 | 1 | 0.000% | 0.000% | 0.00003% | 15.08 | 0.6942 | 5.00% | 5.00% | 0.00001% | 14.08 | 0.6197 | 0.6434 | 0.9763 | 0.931 | 0.00003% |
| word 9 | word 11 | 10000 | 10000 | 10 | 0.288% | 0.288% | 0.00029% | -1.53 | -0.0829 | 0.10% | 0.10% | 0.00029% | -1.52 | -0.0828 | 0.4652 | 0.4520 | 0.092 | 0.00029% |
| word 10 | word 12 | 3472221 | 3472221 | 3472221 | 100.000% | 100.000% | 99.99997% | 0.00 | 1.0000 | 100.00% | 100.00% | 99.99997% | 0.00 | 1.0000 | 0.0000 | 1.99999 | 8.000 | 99.99997% |
| word 10 | word 13 | 3472221 | 3472222 | 0.1 | 100.000% | 100.000% | 0.00000% | -25.05 | -1.0000 | 0.00% | 0.00% | 0.00029% | -18.39 | -1.0000 | 0.0000 | 0.00000 | 0.000 | 0.00029% |
| word 14 | word 15 | 100 | 100 | 0 | 0.003% | 0.003% | 0.00000% |  |  | 0.00% | 0.00% | 0.00000% | -3.46 | -0.1029 | 0.6069 | 0.29026 | 0.024 | 0.00000% |

FIG. 19

| Data | Number of Documents | Number of CATS | Baseline | Term-by-Document SVD | Skip-Gram | Sentence Term-by-Term SVD | Document Term-by-Term SVD |
|---|---|---|---|---|---|---|---|
| Airline | 6,163 | 15 | 32.7% | 80.5% | 65.9% | 73.8% | 74.2% |
| Newsgroups | 19,287 | 20 | 5.1% | 74.1% | 70.3% | 76.6% | 78.2% |
| NHTSA 2008 | 38,072 | 26 | 12.2% | 73.6% | 64.8% | 73.1% | 73.4% |

2400

| Data | Without Virtual Terms | With Virtual Terms |
|---|---|---|
| Airline | 80.5% | 92.4% |
| Newsgroups | 74.1% | 74.2% |
| NHTSA 2008 | 73.6% | 73.4% |

| Object | Person's ID | Start Time | Stop Time | Activity |
|---|---|---|---|---|
| 52 | 30100014165 | 4:00:00 | 5:00:00 | Sleeping |
| 53 | 30100014165 | 5:00:00 | 5:30:00 | Washing, dressing and grooming |
| 54 | 30100014165 | 5:30:00 | 5:45:00 | Travel related to working |
| 55 | 30100014165 | 5:45:00 | 13:00:00 | Work, main job |

WORD EMBEDDINGS AND VIRTUAL TERMS

RELATED APPLICATIONS

This application is a continuation of U.S. application Ser. No. 16/838,221, filed Apr. 2, 2020, which claims the benefit of U.S. Provisional Application No. 62/831,693, filed Apr. 9, 2019, the disclosures of each of which are incorporated herein by reference in their entirety.

BACKGROUND

Word embeddings are used in language modeling and feature learning where words or phrases from a list of possible terms are mapped to a continuous vector space representing the relatedness of the words. These word embeddings can be useful for topic analysis (e.g., to determine food related words). Terms of the word embeddings are typically a single word or multiple words with a fixed distance between words (e.g., a single phrase).

SUMMARY

In one example embodiment, a computer-program product tangibly embodied in a non-transitory machine-readable storage medium is provided. The computer-program product includes instructions operable to cause a computing system to receive a collection comprising multiple sets of ordered terms. The multiple sets of ordered terms comprise a first set. The computer-program product includes instructions operable to cause a computing system to generate a dataset indicating an association between each pair of terms within a same set of the collection by generating one or more co-occurrence scores for the first set. A given co-occurrence score indicates a frequency of co-occurrence of a given pair of terms within the first set. The computer-program product includes instructions operable to cause a computing system to generate a dataset indicating an association between each pair of terms within a same set of the collection by generating computed probabilities based on the one or more co-occurrence scores for the first set. Each of the computed probabilities indicate a likelihood that one term in a given pair of terms of the collection appears in a given set of the collection given that another term in the given pair of terms of the collection occurs. The computer-program product includes instructions operable to cause a computing system to generate a dataset indicating an association between each pair of terms within a same set of the collection by smoothing the computed probabilities by adding one or more random observations. The computer-program product includes instructions operable to cause a computing system to generate a dataset indicating an association between each pair of terms within a same set of the collection by generating one or more association indications for the first set based on the smoothed computed probabilities. A respective association indication of the one or more association indications indicates an association between a respective pair of terms within the first set. The computer-program product includes instructions operable to cause a computing system to output an indication of the dataset.

In one or more embodiments, the generating the computed probabilities based on the one or more co-occurrence scores for the first set comprises computing a first weighting, and weighting a given co-occurrence score for the first set by applying the first weighting to the given co-occurrence score for the first set. The first weighting is one of variable weights for the first set that varies based on a respective distance between a respective pair of terms within the first set.

In one or more embodiments, the instructions are operable to cause a computing system to obtain a variable $\lambda$, where $0 \leq \lambda \leq 1$; and generating the first weighting ($w_{ij}$) comprises generating:

$$w_{ij}=1/\delta^{\lambda},$$

where $\delta$ is the distance between term i and term j of the respective pair of terms.

In one or more embodiments, the generating the computed probabilities based on the one or more co-occurrence scores for the first set comprises multiplying each of weighted co-occurrence scores of the one or more co-occurrence scores of the first set by a constant c such that an average of the one or more co-occurrence scores for the first set corresponds to a value of 1.

In one or more embodiments, the smoothing the computed probabilities comprises: receiving a parameter from a user of the computing system indicating a default level of random observations; adding the default level of random observations; and generating an association measure which is a modified normalized pointwise mutual information score based on the smoothed computed probabilities.

In one or more embodiments, generating a given association indication of the one or more association indications comprises shifting an association measure by a variable pseudocount based on how common the term pair is within the collection.

In one or more embodiments, the generating the one or more association indications for the first set comprises computing an association indication for term i and term j ($A_{ij}$), wherein:

$$A_{ij} = \frac{\log(P_i P_j)}{\log(\hat{P}(i,j))} - \frac{\log(P_i P_j)}{\log(\hat{P}(i,j) \mid X_{ij} = 0)}. \tag{1}$$

where:
$\|D\|$ is a number of sets of ordered terms in the collection;
$X_i$ is a number of sets in which term i occurred in the collection;
$X_j$ is a number of sets in which term j occurred in the collection;
m is a number of random observations;

$$P_i = \frac{X_i}{\|D\|};$$

$$P_j = \frac{X_j}{\|D\|};$$

$X_{ij}$ is a number of times terms i and j occur in the first set of the collection; and $$\hat{P}(i,j) = \frac{(X_{ij} + m P_i P_j)}{\|D\| + m}.$$

In one or more embodiments, the multiple sets of ordered terms further comprise a second set that comprises more ordered terms than the first set.

In one or more embodiments, the instructions are operable to cause a computing system to receive a variable parameter indicating an indicated maximum distance between ordered terms of a given set. A maximum distance between ordered terms of the first set is shorter than the indicated maximum distance and a maximum distance between ordered terms of the second set is longer than the indicated maximum difference. The instructions are operable to cause a computing system to generate the dataset by generating one or more co-occurrence scores for the second set. A given co-occurrence score of the one or more co-occurrence scores for the second set indicates a frequency of co-occurrence of a given pair of terms within the second set within a certain distance apart set based on the variable parameter.

In one or more embodiments, the instructions are operable to cause a computing system to receive one or more settings for calculating the frequency of co-occurrence of a term i and a term j within the first set. The one or more settings comprise one or more of the following settings: an instruction whether to consider a particular order of the term i and the term j; an instruction whether term i and term j can be a same term; and a maximum value for a given co-occurrence score in the first set. In one or more embodiments, the instructions are operable to cause a computing system to generate the one or more co-occurrence scores for the first set based on the one or more settings.

In one or more embodiments, the instructions are operable to cause a computing system to receive a term indication to treat term variations with equivalent stems or meanings as a same term; and generate the one or more co-occurrence scores for the first set based on the term indication.

In one or more embodiments, the instructions are operable to cause a computing system to output an indication of the dataset by generating a singular value decomposition (SVD) for a sparse term-by-term matrix for each set of the collection.

In one or more embodiments, the instructions are operable to cause a computing system to output an indication of the dataset by generating topic data or predictive modeling data based on a vector, or rotated vector, resulting from the SVD.

In one or more embodiments, the instructions are operable to cause a computing system to compute an offset table identifying a position for each term within the collection; and compute a terms table for each set of the collection indicating each term within a respective set. Replicated terms within a row or within a column for the respective set are excluded. Generating the one or more co-occurrence scores for the first set comprises generating the one or more co-occurrence scores for the first set based on the offset table and a respective terms table for the first set.

In one or more embodiments, the collection represents text information and terms of the multiple sets of ordered terms comprise tokens or combinations of tokens in the text information. The instructions are operable to cause a computing system to determine the first set based on a clause or sentence boundary in the text information.

In one or more embodiments, the instructions are operable to cause a computing system to output an indication of the dataset by: determining a category, sentiment or meaning for the text information or a term in the text information based on a given association indication of the one or more association indications for the first set; and outputting the category, sentiment or meaning. The category, sentiment or meaning are one of predefined possible options according to a predefined model outcome.

In one or more embodiments, the collection represents text information or computer-generated data. The instructions are operable to cause a computing system to determine the first set based on locating a symbol in the collection.

In one or more embodiments, the collection represents text information or computer-generated data associated with time information. The instructions are operable to cause a computing system to determine the first set based on a time period indicated by the time information.

In one or more embodiments, the generating the one or more co-occurrence scores for the first set comprises generating at least one co-occurrence score between a virtual term and another term of the first set. The virtual term is a single term that specifies at least two terms that co-occur a variable distance apart.

In one or more embodiments, the instructions are operable to cause a computing system to distribute the collection across multiple computing nodes of computing nodes in a computing network to generate data of identified terms that occurred with the collection; receive the generated data of identified terms; and generate the dataset by distributing the generated data of identified terms across a same or different multiple ones of the computing nodes in the computing network such that an individual node of the multiple computing nodes receives all data associated with a particular term of generated data of identified terms.

In another example, a computer-implemented method is provided. The computer-implemented method comprises receiving a collection comprising multiple sets of ordered terms. The multiple sets of ordered terms comprise a first set. The computer-implemented method comprises generating a dataset indicating an association between each pair of terms within a same set of the collection by generating one or more co-occurrence scores for the first set. A given co-occurrence score indicates a frequency of co-occurrence of a given pair of terms within the first set. The computer-implemented method comprises generating a dataset indicating an association between each pair of terms within a same set of the collection by generating computed probabilities based on the one or more co-occurrence scores for the first set. Each of the computed probabilities indicate a likelihood that one term in a given pair of terms of the collection appears in a given set of the collection given that another term in the given pair of terms of the collection occurs. The computer-implemented method comprises generating a dataset indicating an association between each pair of terms within a same set of the collection by smoothing the computed probabilities by adding one or more random observations. The computer-implemented method comprises generating a dataset indicating an association between each pair of terms within a same set of the collection by generating one or more association indications for the first set based on the smoothed computed probabilities. A respective association indication of the one or more association indications indicates an association between a respective pair of terms within the first set. The computer-implemented method comprises generating a dataset indicating an association between each pair of terms within a same set of the collection by outputting an indication of the dataset.

In one or more embodiments, the computer-implemented method comprises a method to implement any of the instructions of the computer-program product as described herein.

In one or more embodiments, the generating the computed probabilities based on the one or more co-occurrence scores for the first set comprises: computing a first weighting; and weighting a given co-occurrence score for the first set by applying the first weighting to the given co-occurrence score for the first set. The first weighting is one of variable weights for the first set that varies based on a respective distance between a respective pair of terms within the first set In one or more embodiments, the computer-implemented method comprises obtaining a variable λ, where 0≤λ≤1. The generating the first weighting ($w_{ij}$) comprises generating:

$$w_{ij} 32\ 1/\delta^{\lambda},$$

where δ is the distance between term i and term j of the respective pair of terms.

In one or more embodiments, the smoothing the computed probabilities comprises: receiving a parameter from a user of the computing system indicating a default level of random observations; adding the default level of random observations; and generating an association measure which is a modified normalized pointwise mutual information score based on the smoothed computed probabilities.

In one or more embodiments, the generating a given association indication of the one or more association indications comprises shifting an association measure by a variable pseudocount based on how common the term pair is within the collection.

In one or more embodiments, the generating the one or more association indications for the first set comprises computing an association indication for term i and term j($A_{ij}$), according to equation (1).

In one or more embodiments, the multiple sets of ordered terms further comprise a second set that comprises more ordered terms than the first set. In one or more embodiments, the computer-implemented method further comprises receiving a variable parameter indicating an indicated maximum distance between ordered terms of a given set. A maximum distance between ordered terms of the first set is shorter than the indicated maximum distance, and a maximum distance between ordered terms of the second set is longer than the indicated maximum difference. The generating the dataset comprises generating one or more co-occurrence scores for the second set. A given co-occurrence score of the one or more co-occurrence scores for the second set indicates a frequency of co-occurrence of a given pair of terms within the second set within a certain distance apart set based on the variable parameter.

In one or more embodiments, the computer-implemented method further comprises receiving one or more settings for calculating the frequency of co-occurrence of a term i and a term j within the first set. The one or more settings comprise one or more of the following settings: an instruction whether to consider a particular order of the term i and the term j; an instruction whether term i and term j can be a same term; and a maximum value for a given co-occurrence score in the first set. The generating the one or more co-occurrence scores for the first set comprises generating the one or more co-occurrence scores for the first set based on the one or more settings.

In one or more embodiments, the outputting an indication of the dataset comprises generating a singular value decomposition (SVD) for a sparse term-by-term matrix for each set of the collection.

In one or more embodiments, the collection represents text information and terms of the multiple sets of ordered terms comprise tokens or combinations of tokens in the text information. The computer-implemented method further comprises determining the first set based on a clause or sentence boundary in the text information.

In another example, a computing system is provided. The computing system includes, but is not limited to, a processor and memory. The memory contains instructions executable by the processor wherein the computing system is configured to receive a collection comprising multiple sets of ordered terms. The multiple sets of ordered terms comprise a first set. The computing system is configured to generate a dataset indicating an association between each pair of terms within a same set of the collection by generating one or more co-occurrence scores for the first set. A given co-occurrence score indicates a frequency of co-occurrence of a given pair of terms within the first set. The computing system is configured to generate a dataset indicating an association between each pair of terms within a same set of the collection by generating computed probabilities based on the one or more co-occurrence scores for the first set. The computed probabilities indicate a likelihood that one term in a given pair of terms of the collection appears in a given set of the collection given that another term in the given pair of terms of the collection occurs. The computing system is configured to generate a dataset indicating an association between each pair of terms within a same set of the collection by smoothing the computed probabilities by adding one or more random observations. The computing system is configured to generate a dataset indicating an association between each pair of terms within a same set of the collection by generating one or more association indications for the first set based on the smoothed computed probabilities. A respective association indication of the one or more association indications indicates an association between a respective pair of terms within the first set. The computing system is configured to output an indication of the dataset.

In one or more embodiments, the computing system is configured to implement any of the computer-implemented methods or instructions of the computer-program product as described herein.

In another example embodiment, a computer-program product tangibly embodied in a non-transitory machine-readable storage medium. The computer-program product including instructions operable to cause a computing system to receive a dataset of a dictionary of possible terms. The dataset is for identifying one or more of the possible terms in data comprising ordered terms. The computer-program product including instructions operable to cause a computing system to obtain computer-generated association measures. Each association measure of the computer-generated association measures is an association between a pair of terms from a plurality of identified terms of the possible terms that were identified in the data. The identified terms comprise a first term and a second term. The computer-program product including instructions operable to cause a computing system to, based on one or more of the obtained computer-generated association measures, generate a virtual term. The virtual term comprises a single term that specifies the first term and the second term that co-occur a variable distance apart. The computer-program product including instructions operable to cause a computing system to output an indication to include the virtual term in the dataset of possible terms.

In one or more embodiments, the instructions are operable to cause a computing system to receive a parameter indicating a ratio of a number of the possible terms to a number of allowed virtual terms; generate, based on the obtained computer-generated association measures, a plurality of virtual terms that exceeds the number of allowed virtual terms; and select a subset of the plurality of virtual terms. The subset comprises a number of selected virtual terms that is equal to or less than the number of allowed virtual terms.

In one or more embodiments, the instructions are operable to cause a computing system to: compare the computer-generated association measures; and select the subset based on the comparison.

In one or more embodiments, the instructions are operable to cause a computing system to: generate, based on the obtained computer-generated association measures, a plurality of virtual terms; receive a target variable for a supervised machine learning algorithm; and execute the supervised machine learning algorithm to select, based on the target variable, a subset of the plurality of virtual terms. The subset comprises the virtual term. The instructions are operable to cause a computing system to output the indication to include the subset in the dataset of possible terms.

In one or more embodiments, the instructions are operable to cause a computing system to: generate, based on the obtained computer-generated association measures, a plurality of virtual terms; determine correlations between individual virtual terms of the plurality of virtual terms and predefined topics; and select a subset of the plurality of virtual terms based on the correlations. The subset comprises the virtual term. The instructions are operable to cause a computing system to output an indication to include the subset in the dataset of possible terms.

In one or more embodiments, the instructions are operable to cause a computing system to cause a computing system to output the indication by: comparing the computer-generated association measures of a plurality of generated virtual terms to a threshold; and selecting virtual terms of the plurality of generated virtual terms that exceed the threshold.

In one or more embodiments, the instructions are operable to cause a computing system to output the indication to include the virtual term in the dataset of possible terms by: outputting a generated dataset comprising the possible terms and the virtual term; or appending the virtual term to the dataset of possible terms to generate the generated dataset.

In one or more embodiments, the instructions are operable to cause a computing system to generate one or more features for the virtual term, wherein a given feature of the one or more features indicates a correlation with one or more of a topic, category, sentiment or meaning of one of predefined possible options. The instructions are operable to cause a computing system to receive new data subsequent to the data comprising the ordered terms. The new data comprises one or more different terms or a different term ordering than the data comprising the ordered terms. The instructions are operable to cause a computing system to identify the virtual term in the new data according to the generated dataset; and identify one or more features about the new data based on the one or more features for the virtual term.

In one or more embodiments, the virtual term is an initial virtual term. The instructions are operable to cause a computing system to: obtain a computer-generated association measure of an association between the initial virtual term and another term of the generated dataset; and based on the obtained computer-generated association measure, generate an additional virtual term that specifies the initial virtual term and the another term that co-occurs in the data a variable distance apart. The instructions are operable to cause a computing system to output an indication to include the additional virtual term in the dataset of possible terms.

In one or more embodiments, the virtual term specifies more than two terms that co-occur in the data. Additionally, or alternatively, the virtual term specifies an ordering for the first term and the second term. Additionally, or alternatively, the virtual term specifies a maximum distance between the first term and the second term. Additionally, or alternatively, the first term or the second term indicates a plurality of terms of the same stem.

In one or more embodiments, the data represents text information, and the computer-generated association measures are a measure of association between each of the pairs of the plurality of identified terms of the possible terms that were identified within a sentence of the data.

In one or more embodiments, the computer-generated association measures are based on a frequency of co-occurrence of each pair of identified terms of the possible terms that were identified in the data and a variable weighting based on a distance between terms of a respective pair of the plurality of identified terms.

In one or more embodiments, the instructions are operable to cause a computing system to generate a virtual term by: receiving, from a user of the computing system, a user identification of the first term; and displaying, on a display device, candidate terms for the virtual term. The candidate terms comprise the second term. The instructions are operable to cause a computing system to generate a virtual term by receiving, from the user of the computing system, a user selection of the second term.

In one or more embodiments, the instructions are operable to cause the computing system to implement any of the instructions, methods or operations of a computing system described herein.

In another example embodiment, a computer-implemented method is provided. The computer-implemented method comprises obtaining a dataset of a dictionary of possible terms for identifying one or more of the possible terms in data comprising ordered terms. The computer-implemented method comprises obtaining computer-generated association measures. Each association measure of the computer-generated association measures is an association between a pair of terms from a plurality of identified terms of the possible terms that were identified in the data. The identified terms comprise a first term and a second term. The computer-implemented method comprises, based on one or more of the obtained computer-generated association measures, generating a virtual term. The virtual term comprises a single term that specifies the first term and the second term that co-occur a variable distance apart. The computer-implemented method comprises outputting an indication to include the virtual term in the dataset of possible terms.

In one or more embodiments, the instructions are operable to cause the computing system to implement any of the instructions, methods or operations of a computing system described herein.

In one or more embodiments, the computer-implemented method further comprises: receiving a parameter indicating a ratio of a number of the possible terms to a number of allowed virtual terms; generating, based on the obtained computer-generated association measures, a plurality of virtual terms that exceeds the number of allowed virtual terms; and selecting a subset of the plurality of virtual terms. The subset comprises a number of selected virtual terms that is equal to or less than the number of allowed virtual terms.

In one or more embodiments, the computer-implemented method further comprises: comparing the computer-generated association measures; and selecting the subset based on the comparison.

In one or more embodiments, the computer-implemented method further comprises: generating, based on the obtained computer-generated association measures, a plurality of virtual terms; receiving a target variable for a supervised machine learning algorithm; and executing the supervised machine learning algorithm to select, based on the target variable, a subset of the plurality of virtual terms. The subset comprises the virtual term. The computer-implemented method further comprises outputting the indication to include the subset in the dataset of possible terms.

In one or more embodiments, the computer-implemented method further comprises: generating, based on the obtained computer-generated association measures, a plurality of virtual terms; determining correlations between individual virtual terms of the plurality of virtual terms and predefined topics; and selecting a subset of the plurality of virtual terms based on the correlations. The subset comprises the virtual term. The computer-implemented method further comprises outputting an indication to include the subset in the dataset of possible terms.

In one or more embodiments, the outputting the indication comprises: comparing the computer-generated association measures of a plurality of generated virtual terms to a threshold; and selecting virtual terms of the plurality of generated virtual terms that exceed the threshold.

In one or more embodiments, the outputting the indication comprises including the virtual term in the dataset of possible terms by: outputting a generated dataset comprising the possible terms and the virtual term; or appending the virtual term to the dataset of possible terms to generate the generated dataset.

In one or more embodiments, the computer-implemented method further comprises generating one or more features for the virtual term. A given feature of the one or more features indicates a correlation with a topic, category, sentiment or meaning of one of predefined possible options. The computer-implemented method further comprises receiving new data subsequent to the data comprising the ordered terms. The new data comprising one or more different terms or a different term ordering than the data comprising the ordered terms. The computer-implemented method further comprises identifying the virtual term in the new data according to the generated dataset; and identifying one or more features about the new data based on the one or more features for the virtual term.

In one or more embodiments, the virtual term is an initial virtual term. The computer-implemented method further comprises: obtaining a computer-generated association measure of an association between the initial virtual term and another term of the generated dataset; based on the obtained computer-generated association measure, generating an additional virtual term that specifies the initial virtual term and the another term that co-occurs in the data a variable distance apart; and outputting an indication to include the additional virtual term in the dataset of possible terms.

In one or more embodiments, the data represents text information and the computer-generated association measures are a measure of association between each of the pairs of the plurality of identified terms of the possible terms that were identified within a sentence of the data.

In one or more embodiments, the computer-generated association measures are based on a frequency of co-occurrence of each pair of the identified terms of the possible terms that were identified in the data and a variable weighting based on a distance between terms of a respective pair of the plurality of identified terms.

In one or more embodiments, the computer-implemented method further comprises generating a virtual term by: receiving, from a user of the computing system, a user identification of the first term; and displaying, on a display device, candidate terms for the virtual term. The candidate terms comprise the second term. In one or more embodiments, the computer-implemented method further comprises generating a virtual term by receiving, from the user of the computing system, a user selection of the second term.

In one or more embodiments, the virtual term specifies one or more specifications. A given specification, of the one or more specifications, specifies: more than two terms that co-occur in the data; an ordering for the first term and the second term; or a maximum distance between the first term and the second term.

In another example embodiment, a computing system is provided. The computing system comprises, but is not limited to, a processor and memory. The memory contains instructions executable by the processor wherein the computing system is configured to: receive a dataset of a dictionary of possible terms for identifying one or more of the possible terms in data comprising ordered terms; and obtain computer-generated association measures. Each association measure of the computer-generated association measures is an association between a pair of terms from a plurality of identified terms of the possible terms that were identified in the data. The identified terms comprise a first term and a second term. The memory contains instructions executable by the processor wherein the computing system is configured to: based on one or more of the obtained computer-generated association measures, generate a virtual term; and output an indication to include the virtual term in the dataset of possible terms. The virtual term comprises a single term that specifies the first term and the second term that co-occur a variable distance apart.

In one or more embodiments, the instructions are operable to cause the computing system to implement any of the instructions, methods or operations of a computing system described herein.

Other features and aspects of example embodiments are presented below in the Detailed Description when read in connection with the drawings presented with this application.

BRIEF DESCRIPTION OF THE DRAWINGS

FIG. 15A illustrates example input data in at least one embodiment of the present technology.

FIG. 15B illustrates an example dictionary of possible terms in at least one embodiment of the present technology.

FIG. 15C illustrates an example offset table in at least one embodiment of the present technology.

FIG. 16A illustrates example co-occurrence scores in at least one embodiment of the present technology.

FIG. 16B illustrates example node input in at least one embodiment of the present technology.

FIG. 16C illustrates example weighted co-occurrence scores in at least one embodiment of the present technology.

FIGS. 17A-17E illustrate example generation of association indications in at least one embodiment of the present technology.

FIG. 18 illustrates example generation of association indications in at least one embodiment of the present technology.

FIG. 19 illustrates example generation of association indications in at least one embodiment of the present technology.

FIG. 24 illustrates computer performance improvements in embodiments of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
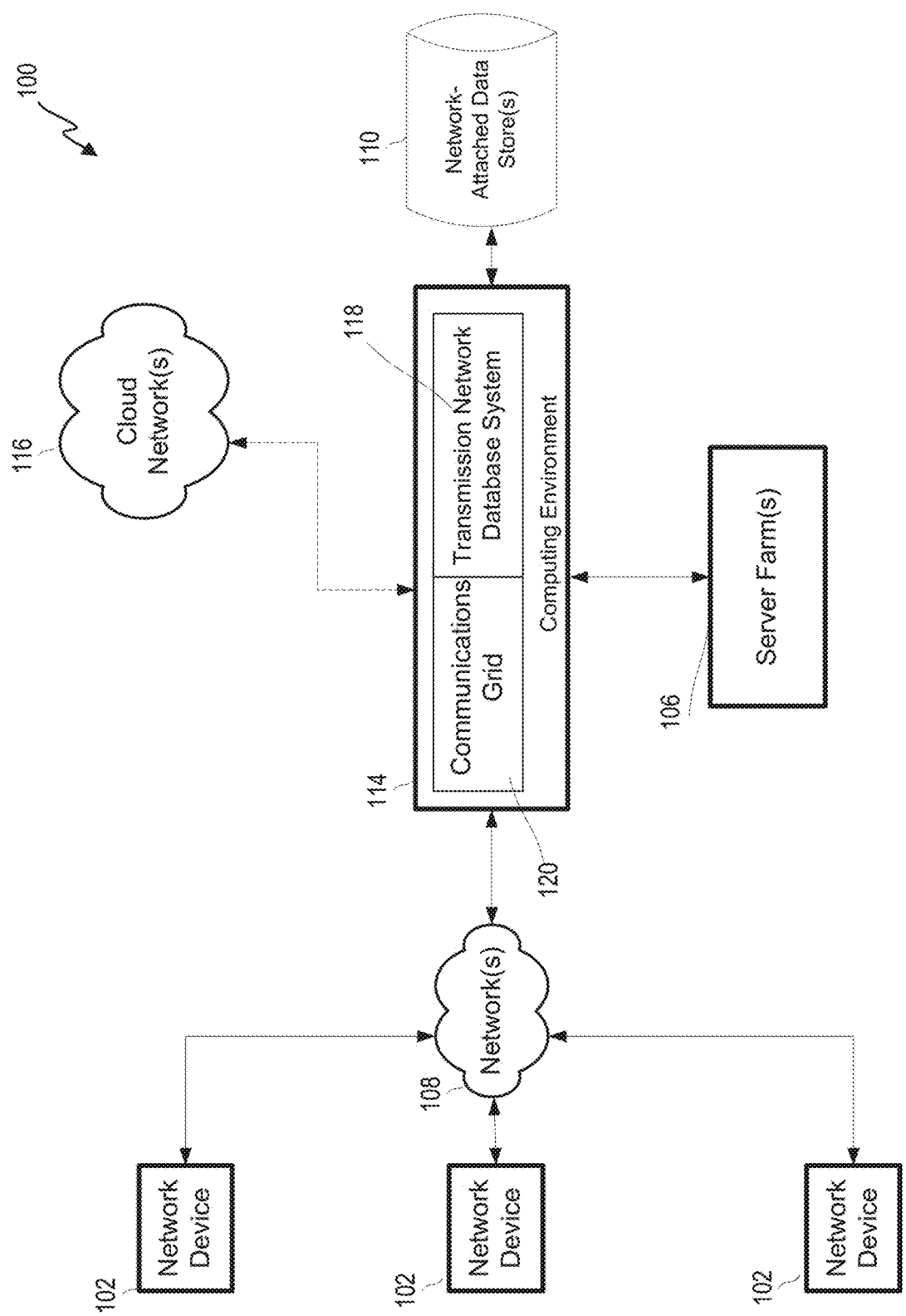
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
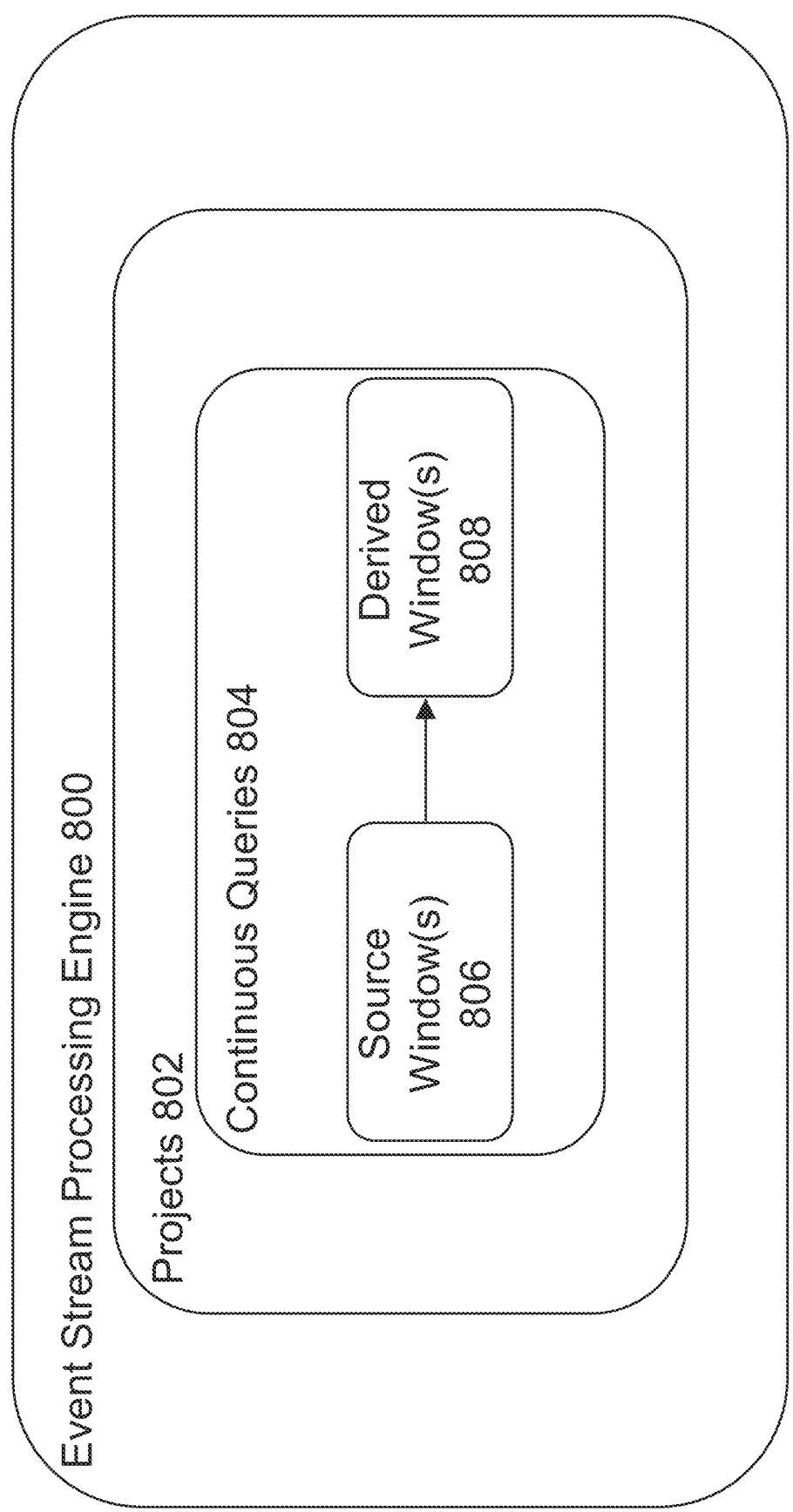
FIG. 8 illustrates a block diagram including components of an Event Stream Processing Engine (ESPE), according to at least one embodiment of the present technology.
Figure 9:
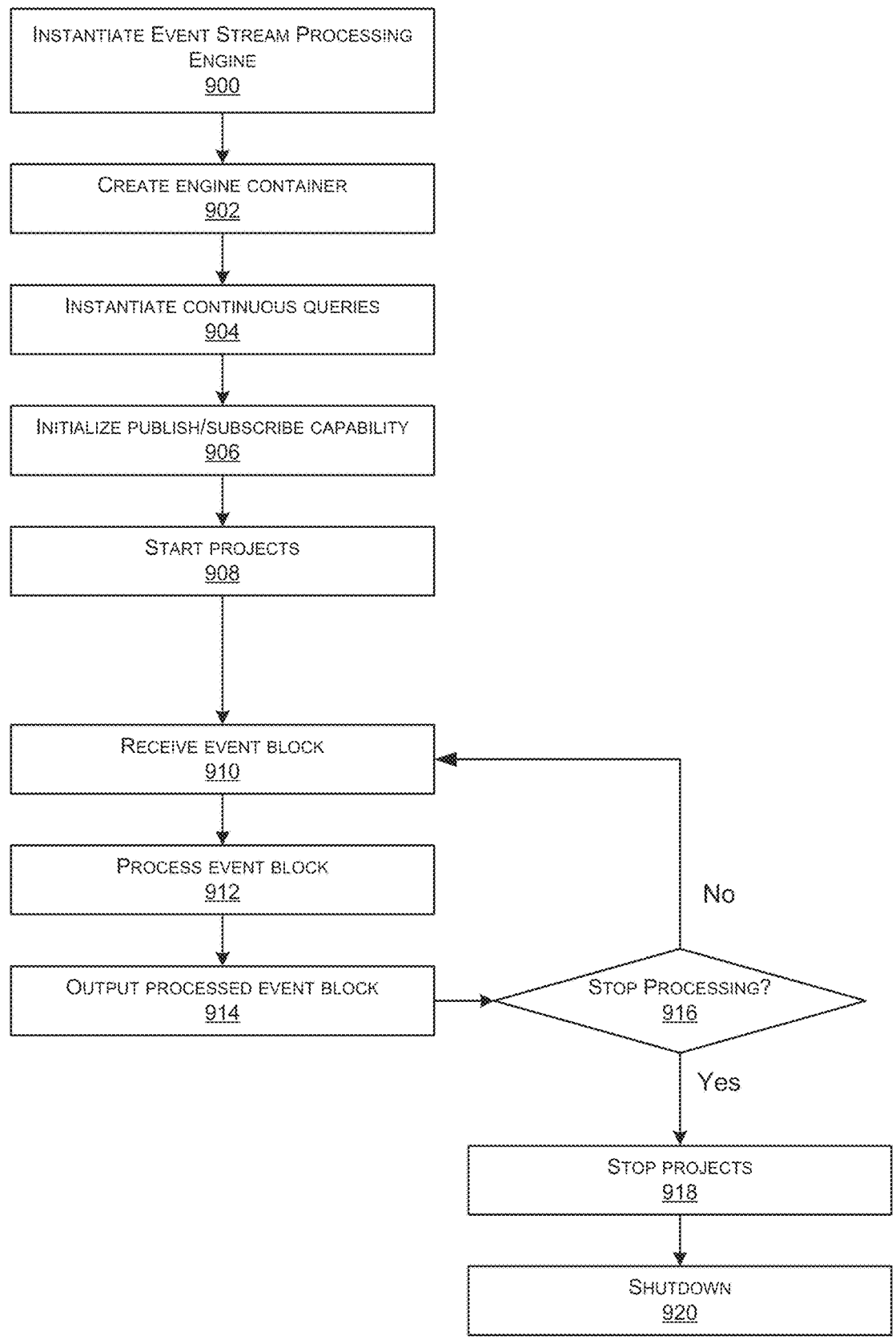
FIG. 9 illustrates a flow chart showing an example process including operations performed by an event stream processing engine, according to at least one embodiment of the present technology.
Figure 10:
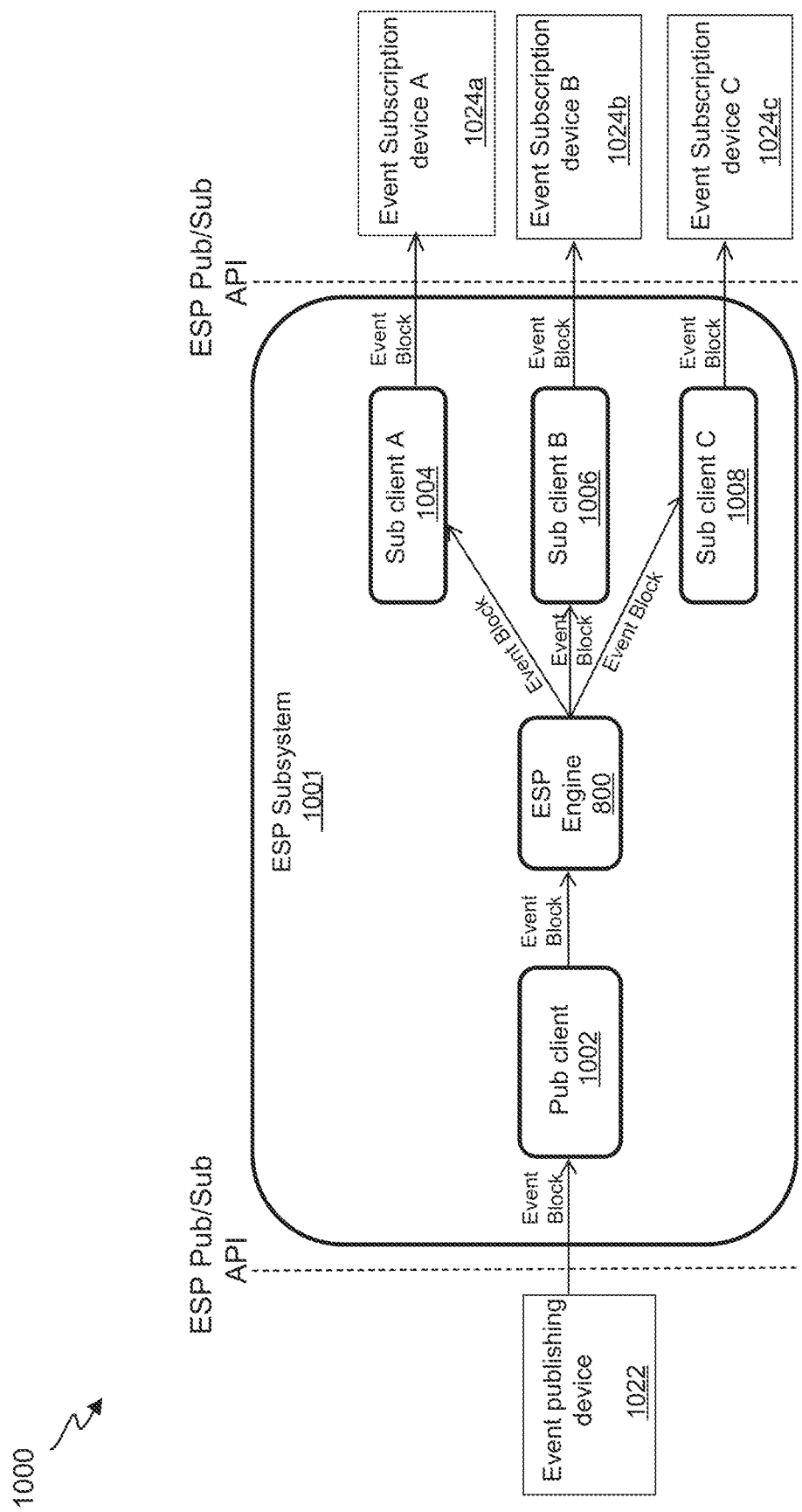
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100. (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
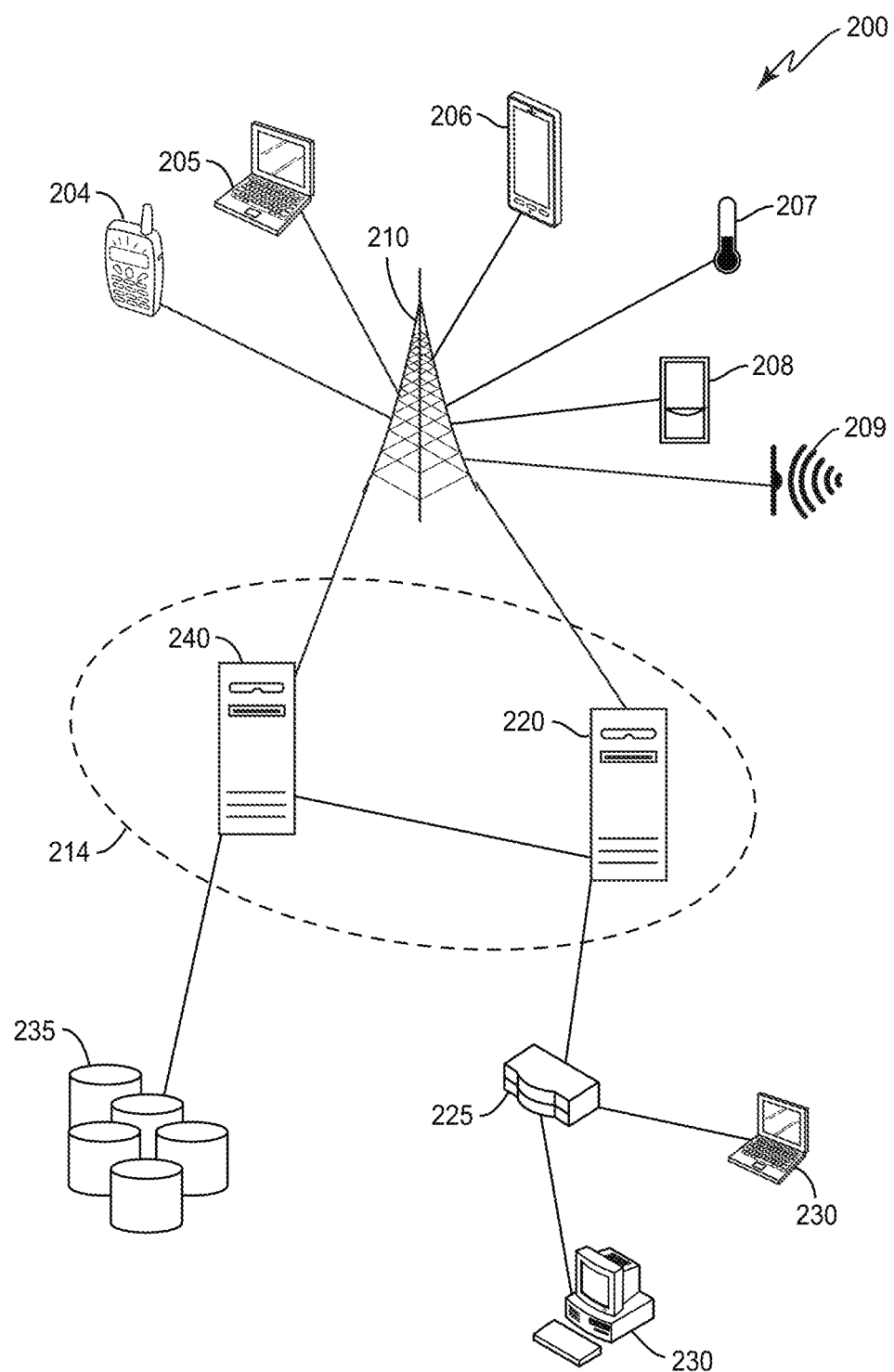
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
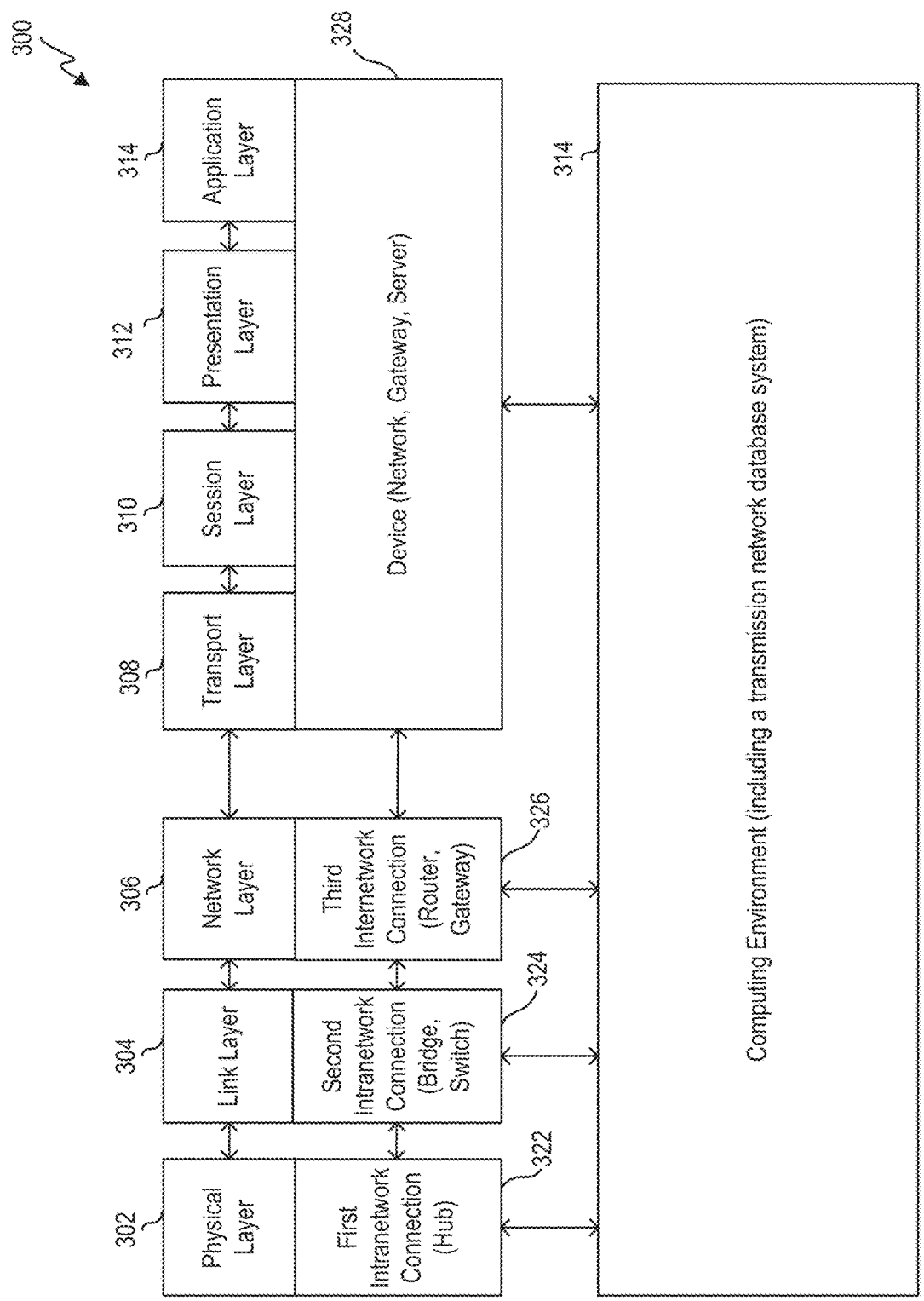
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer 302 and a switch can operate in the link layer 304. Inter-network connection components 326 and 328 are shown to operate on higher levels, such as layers 306-314. For example, routers can operate in the network layer 306 and network devices can operate in the transport, session 308, session layer 310, presentation layer 312, and application layer 314.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
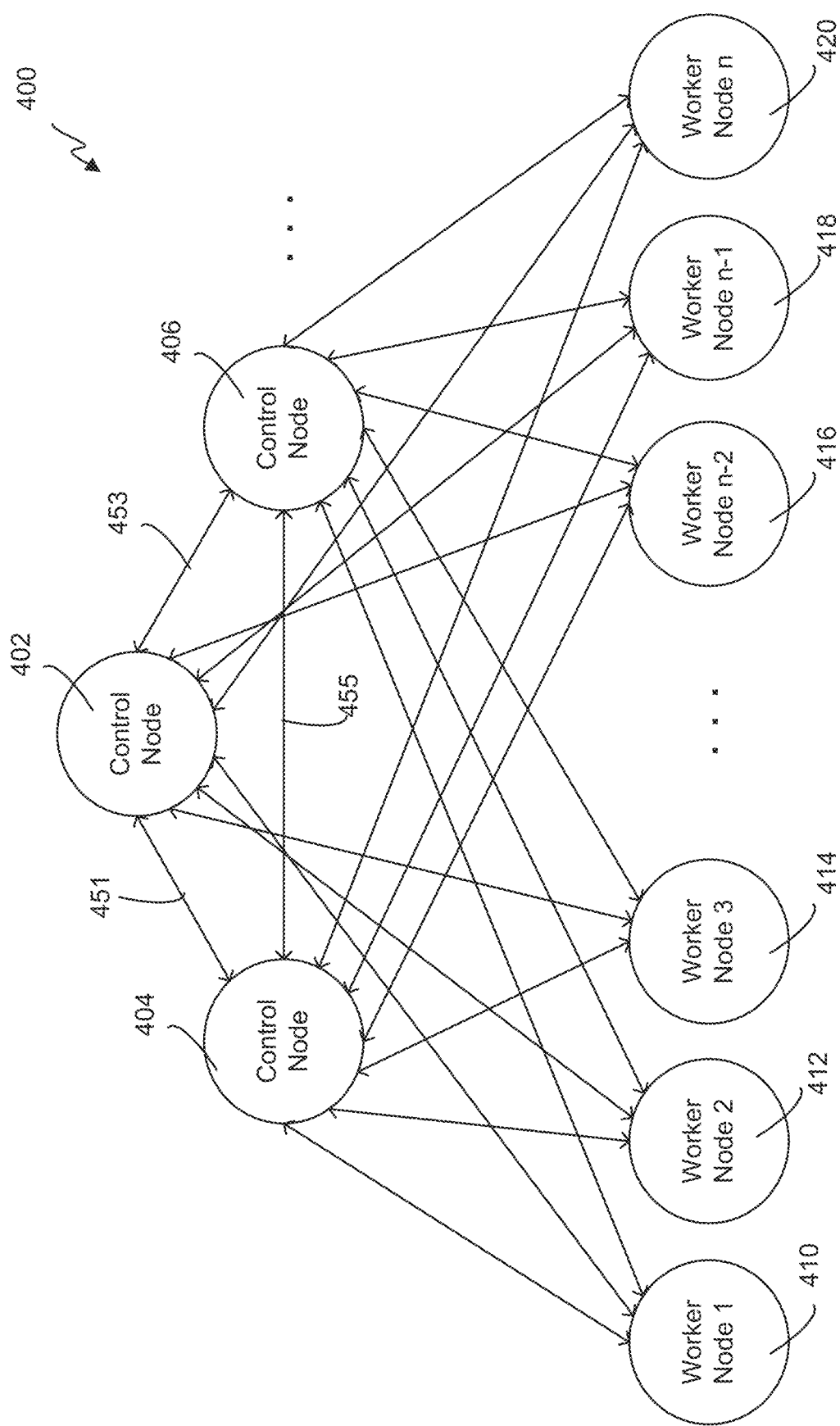
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
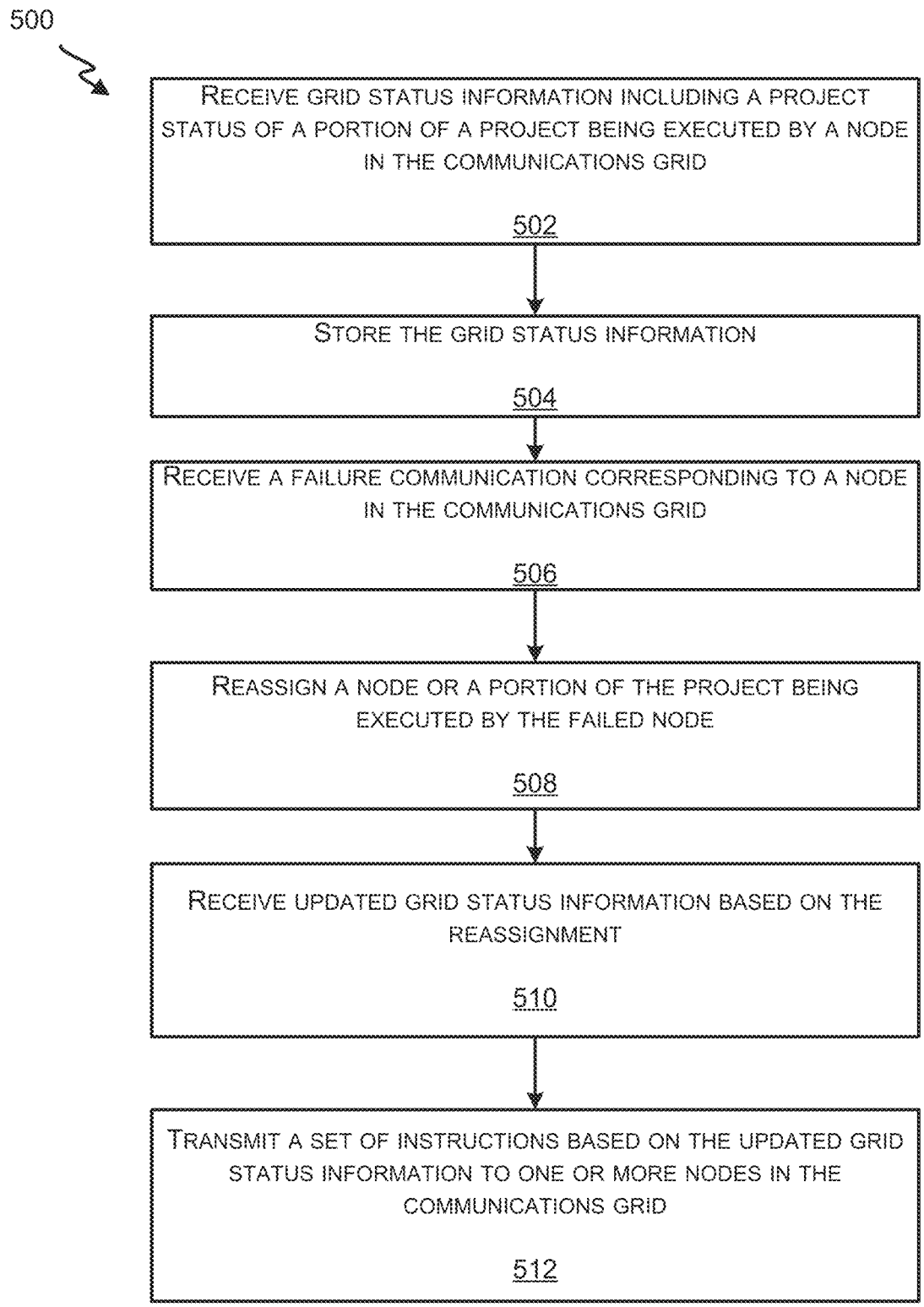
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
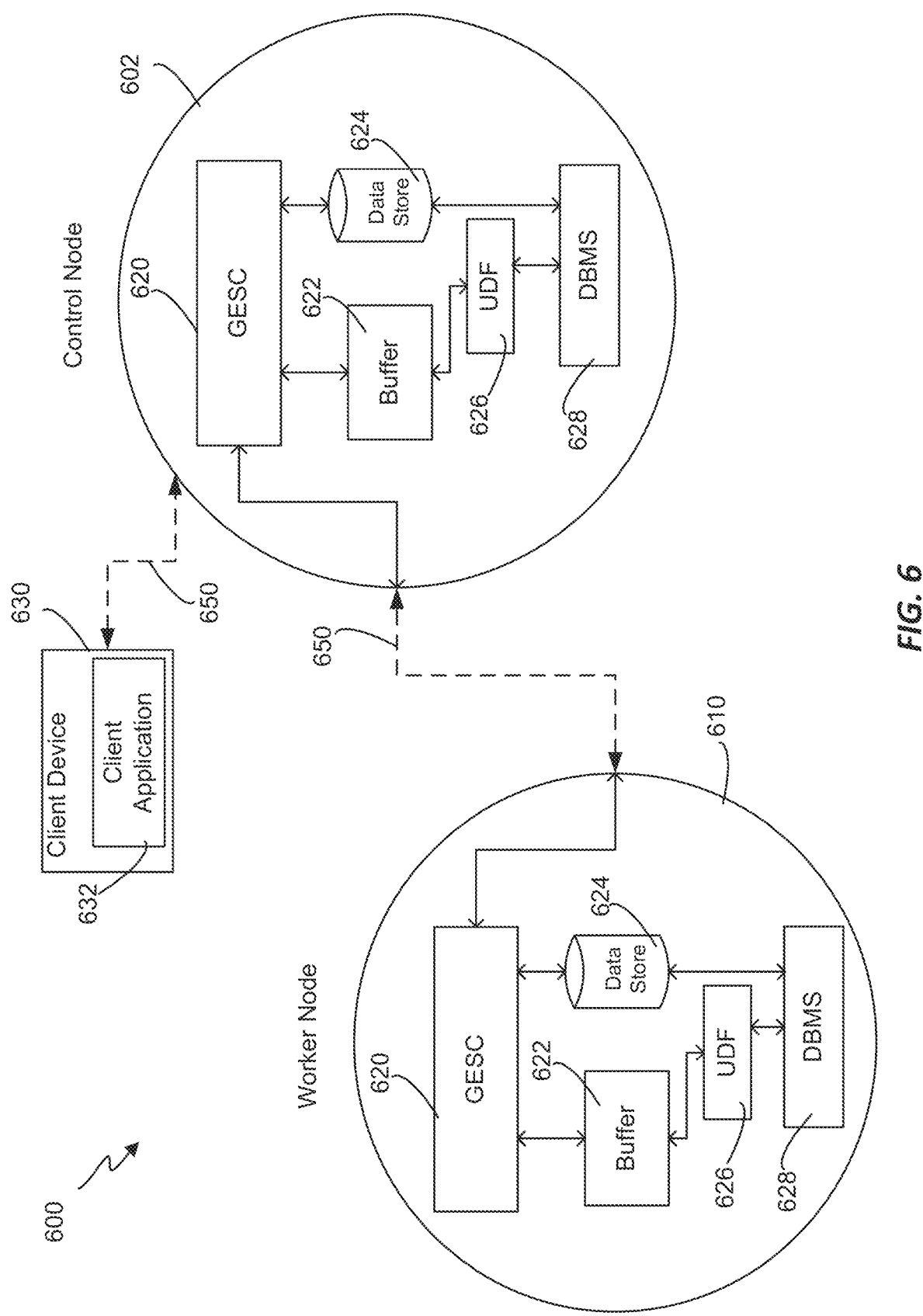
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
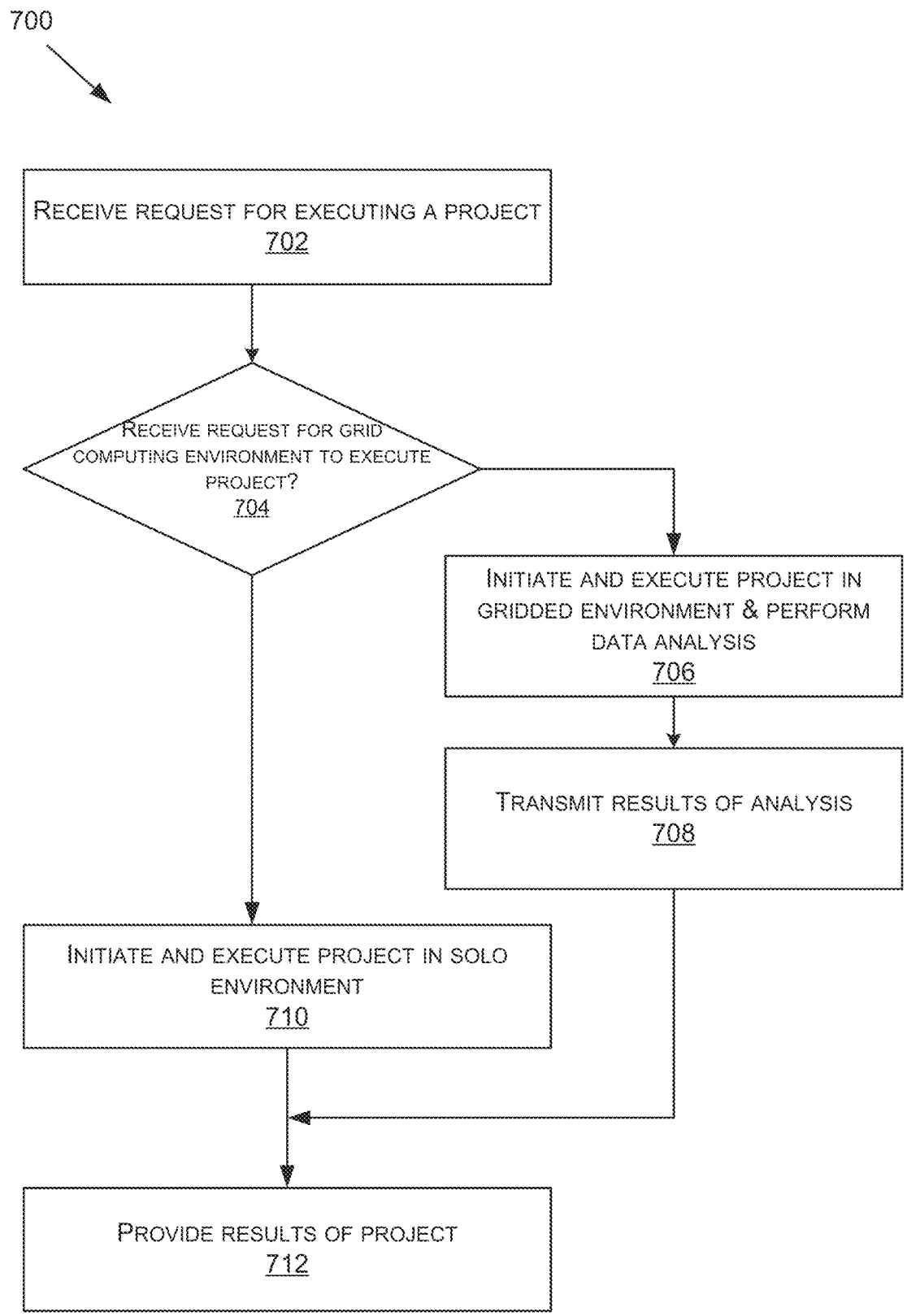
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
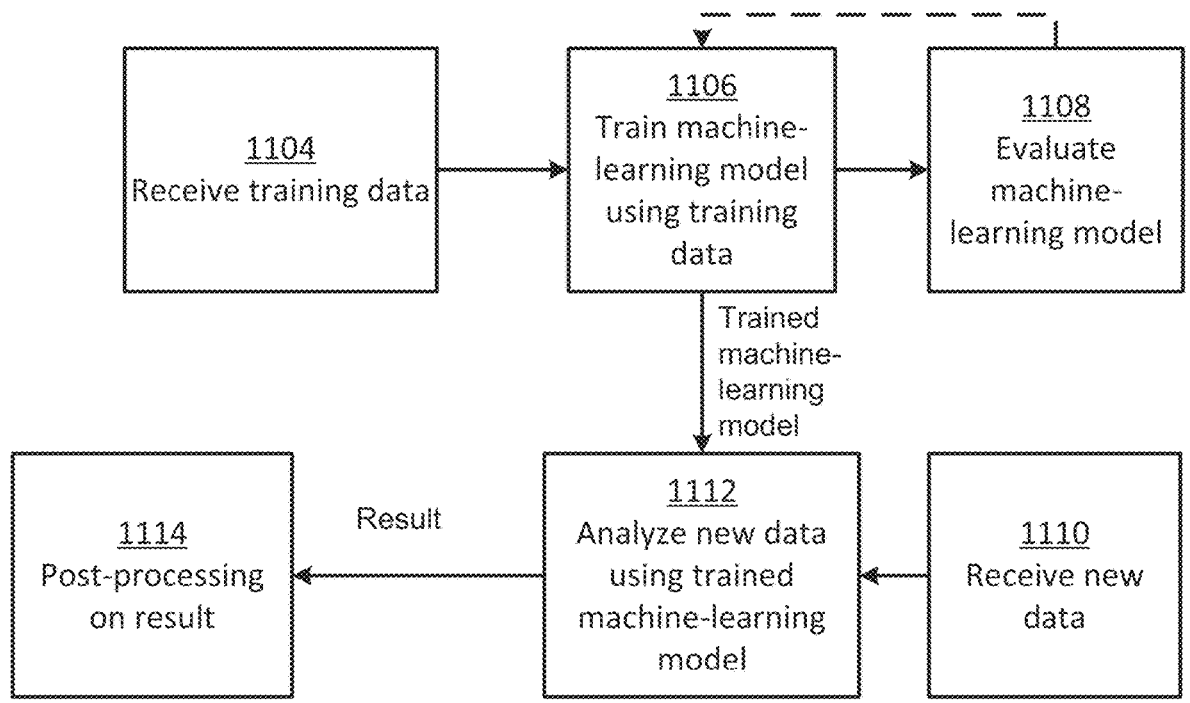
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
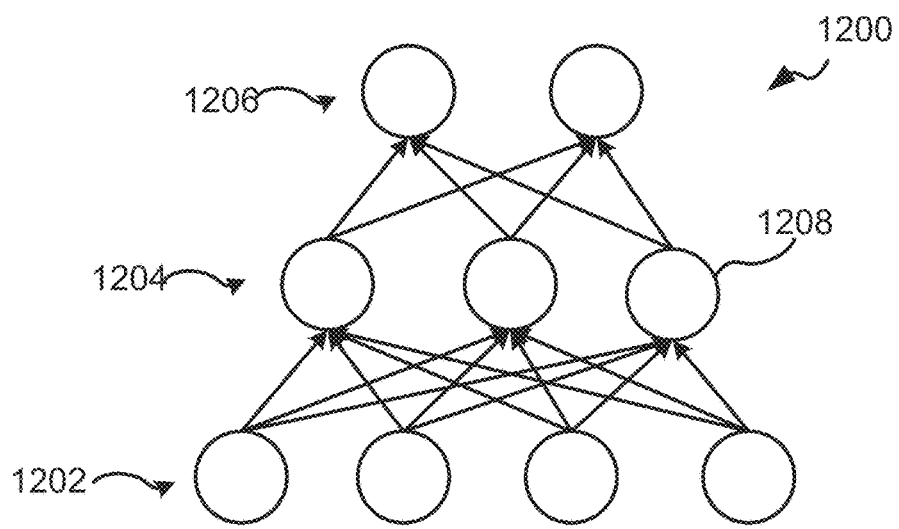
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
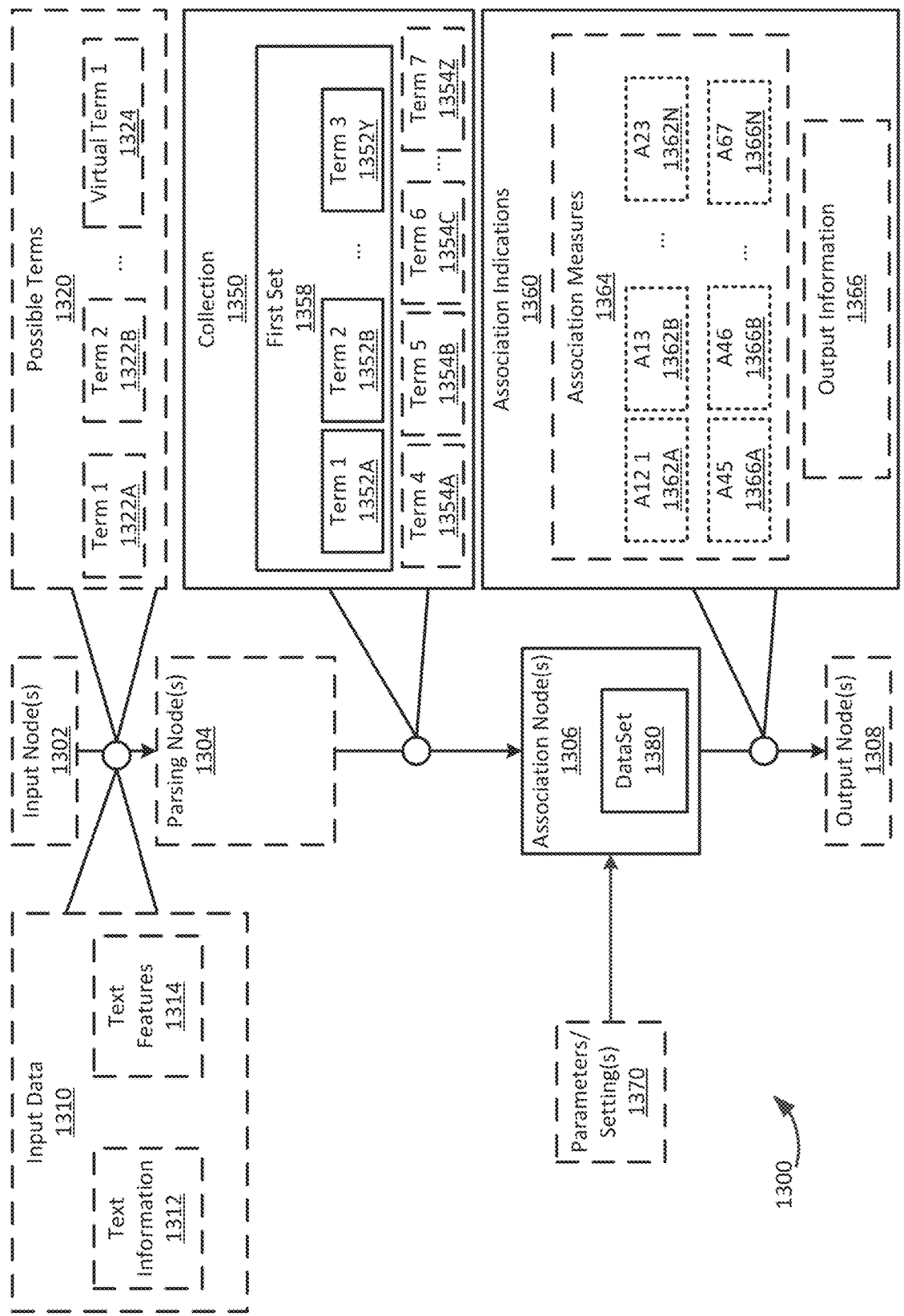
FIG. 13 illustrates a block diagram of a computing system for generating association indications in at least one embodiment of the present technology.

FIG. 13 illustrates a block diagram of a computing system 1300 for generating one or more association indications 1360. The computing system 1300 comprises one or more nodes for generating association indications 1360. Association indications in the context of a sentence may be helpful for identifying patterns and nuance in the words of the sentence. For instance, the association indications can be used to understand the meaning of a sentence or a part of a sentence. As one example, the word "bank" may have a different meaning depending on words associated with it. If the word "bank" is associated with the word "river" in the sentence "They met along the bank of a river," it has a different meaning than when "bank" is associated with the word "deposit" in the sentence "They made a deposit in a bank". Association indications can also be useful for categorizing text information (e.g., into a good review or a bad review). In one example, if "liked" is associated with "not" it may be a bad review (e.g., "He liked the show not at all"). However, if it is not associated with "not" or its associated with another word like "very" it may be a good review (e.g. "He liked the show very much"). Association indications can also be used to gauge sentiment or an emotion of a user (e.g., "shut" associated with "up" could mean the user is angry in ("shut the heck up") and "shut" associated with "please" could mean the user is tranquil in "shut the door please").

The computing system 1300 may comprise one or more association nodes 1306 for generating a dataset 1380 indicating an association between pairs terms (e.g., words) within a set of terms (e.g., a sentence). For example, an association between a pair of terms "river" and "bank". The dataset may comprise association measures 1364 indicating the association by providing a measure or score of the association. The one or more association node 1306 may output an association indication 1360 of the dataset 1380 by outputting the association measures 1364.

In one or more embodiments, the one or more association nodes 1306 generate the dataset 1380 by receiving a collection 1350 comprising multiple sets of ordered terms (e.g., an electronic document comprising multiple sentences). For instance, the multiple sets comprise a first set 1358 of ordered terms 1352 (e.g., words). Other terms 1354 of the collection may be a part of one or more other sets (e.g., a second set or sentence). The one or more association nodes 1306 indicate an association between each pair of terms within a same set of the collection (e.g., association measures 1364). In one or more embodiments, the one or more association nodes 1306 receive parameters or settings 1370 (e.g., parameters or settings related to generating the association indication 1360).

In one or more embodiments, the computing system 1300 comprises one or more input nodes 1302 and/or parsing nodes 1304 for providing a collection 1350 received by the one or more association nodes 1306. For instance, the input nodes 1302 could include one or more input devices for receiving input data 1310 from a user of the computing system 1300. Input devices could include, for example, one or more of a keyboard, a mouse, a trackpad, a sensor, a receiver, and a microphone. Alternatively, or additionally, the input nodes 1302 could receive input data 1310 from one or more computing systems not shown. In one or more examples, the input data 1310 comprises text information 1312. The text information 1312 could comprise information representing human speech or writings. In one or more embodiments, the text information 1312 is associated with one or more text features 1314 (e.g., time information). For example, the input data 1310 could comprise documentary information about the location of people, vehicles, or robots at specific times of the day or state information of a complex computing system as it transitions through time. Alternatively, or additionally the input data comprises other types of computer-generated data with one or more associated features (e.g., transactional purchase data and web click data that records a user's path as she traverses a website).

In one or more embodiments, the input data is parsed by one or more parsing nodes 1304 to generate the collection 1350. For example, the parsing nodes 1304 may receive possible terms 1320, and the parsing nodes 1304 will parse the input data 1310 for those possible terms. The possible terms 1320 may include predefined terms or generated terms. In one or more embodiments, possible terms 1320 include one or more virtual terms 1324 where a virtual term is a single term that specifies at least two terms that co-occur a variable distance apart. For example, "river" and "bank" could appear as "river bank" or "bank of a river" but is a single linked concept. As another example, "German" and "cake" may appear as "German cake", "German Chocolate Cake", or "German Pecan Chocolate Cake". "German" and "cake" can be associated together to form a virtual term.

In one or more embodiments, the parsing nodes 1304 can also be used to determine sets within the collection 1350 (e.g., first set 1358). For instance, the collection 1350 may represent text information comprising tokens or combinations of tokens, where a token is one or more characters of text data. The parsing nodes 1304 could determine clause or sentence boundaries separating sets of tokens.

In the same or different example, the one or more parsing nodes 1304 can be used to determine one or more sets based on locating a symbol in a collection of data (e.g., a period to denote a different sentence, a comma to denote a different clause, a semicolon to denote a different computer instruction, etc.). In the same or different embodiment, where the collection represents text information or computer-generated data associated with time information, the parsing nodes 1304 can determine one or more sets of the collection 1350 based on a time period indicated by the time information.

Merely for illustration one or more nodes described herein may comprise software or communicate with nodes comprising software implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Contextual Analysis, and SAS/IML® all of which are developed and provided by SAS Institute Inc. of Cary, N.C., USA.

The computing system 1300 may also comprise one or more output nodes 1308 for receiving, from the one or more association nodes 1306, an output association indication 1360 of a dataset 1380. For instance, output nodes 1308 could comprise a printer, a display, or storage device.

In one or more embodiments, the one or more association nodes 1306 output the association indication 1360 of a dataset 1380 indicating an association between terms within a set of a collection by outputting association measures 1364 indicating an association between terms. Alternatively, or additionally, the association indication 1360 comprise output information 1366 (e.g., a category, sentiment or meaning for the input data 1310, text information 1312 or a term in the input data 1310). The output information may be based on one or more association measures 1364 for a set of the collection 1350 (e.g., first set 1358). For instance, the output information 1366 could comprise a category for the input data 1310 (e.g., a "good review" or a "bad review"); a sentiment ("e.g." the user is "angry" or "happy"), or a meaning ("e.g., "bank" pertains to a stream or does not pertain to a financial institution). The output category, sentiment or meaning may be one of predefined possible options according to a predefined model outcome (e.g., a model for classifying the input data 1310).

In one or more embodiments, the computing system 1300 is a computing system comprising multiple devices for performing different functions. Alternatively, the computing system is a single computing device and the functions of the multiple nodes are performed on a single computing device.

In cases where the singular or plural form of a node is used in embodiments described herein, one of ordinary skill in the art will understand that multiple or a single node could be used, respectively, instead. For instance, in one or more embodiments, the computing system 1300 comprises multiple nodes for performing the same function (e.g., distributing data across the nodes for parallel processing). The parsing nodes 1304 or the association nodes 1306 may be used to distribute the collection 1350 across multiple computing nodes in a computing network to generate data of identified terms within the collection 1350. In one or more embodiments, the association nodes 1306 or parsing nodes 1304 receive the generated data of identified terms. In one or more embodiments, the association nodes 1306 generate the dataset 1360 by distributing the generated data of terms across the same or different multiple ones of the computing nodes in the computing network such that an individual node of the multiple computing nodes receives all or some data associated with a particular term of generated data of identified terms.

Figure 14A:
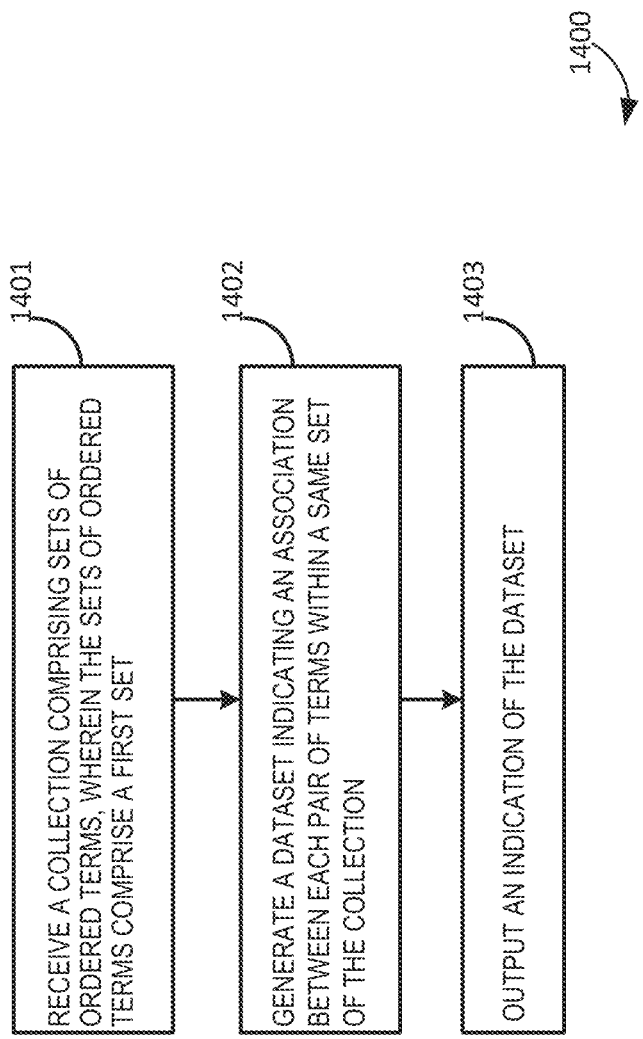
FIGS. 14A and 14B illustrate flow diagrams for generating association indications in at least one embodiment of the present technology.
Figure 14B:
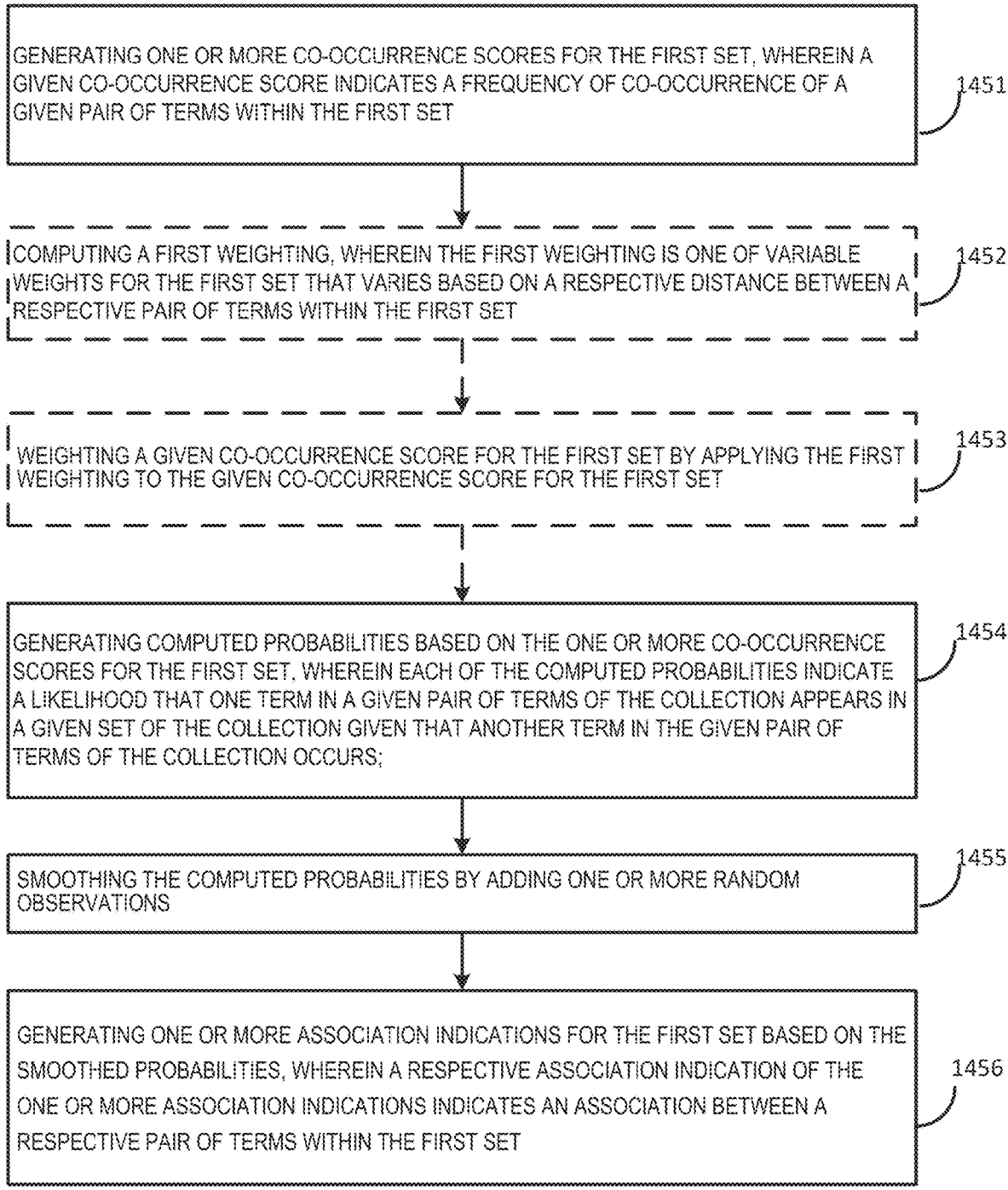

FIGS. 14A and 14B illustrate flow diagrams for generating association indications (e.g., association indication 1360). The methods depicted in FIGS. 14A and 14B may be implemented by a computing system (e.g., computing system 1300).

FIG. 14A shows a method 1400 for outputting an indication of a generated dataset. In an operation 1401, the computing system receives a collection comprising multiple sets of ordered terms (e.g., a paragraph may contain multiple different sentence containing ordered tokens within the sentence). The multiple sets of ordered terms comprise a first set (e.g., a first sentence).

In an operation 1402, the computing system generates a dataset indicating an association between each pair of terms within a same set of the collection.

In an operation 1403, the computing system outputs an indication of the dataset (e.g., outputs an association indication 1360).

In one or more embodiments, an operation is carried out by a series of sequential and/or concurrent operation. For instance, FIG. 14B shows an example method 1450 for generating a data set indicating an association between each pair of terms within a same set of the collection (i.e., operation 1402).

In an operation 1451, the computing system generates one or more co-occurrence scores for the first set. A given co-occurrence score indicates a frequency of co-occurrence of a given pair of terms within a set, for example, how often a pair of terms (e.g., the words "cat" and "that") occur together in a sentence. The scores could also between a virtual term and another term or another virtual term. In this way more than two terms of a sentence may be considered if the virtual term contains two or more terms. In one or more embodiments, the computing system generates the one or more co-occurrence scores for a given set based on an offset table and/or a terms table.

For example, FIG. 15A shows an example text information 1500 comprising two sentence sets: The cat really liked that cat a lot! The cat didn't like that cat very much.

FIG. 15B shows a dictionary 1510 comprising a set of words or other text strings for use in a computing application. For instance, the dictionary 1510 may comprise possible terms for parsing the text information 1500 (e.g., by one or more parsing node 1304). The dictionary 1510 is an example terms table. Each term is shown for each respective set in word column 1512. Replicated terms within a column for a given set are excluded. Alternatively, the dictionary could have been expressed the terms in row form with replicated terms excluded with a row. A unique term identifier is assigned to every term (e.g., a number) in term identifier column 1514. In one or more embodiments, the computing system uses the terms table to generate a customized dictionary table for a collection (e.g., a document collection containing two sentences).

In the example dictionary 1510, the terms are arranged in a processing order for text information 1500, but could be arranged in other orders (e.g., alphabetically). In this example some tokens are treated the same (e.g., liked and like). In one or more embodiments, the computing system receives a term indication to treat term variations with equivalent stems or meanings as a same term (e.g., by receiving a dictionary 1510). The computing system then generates the one or more co-occurrence scores for the first set based on the term indication.

In one or more embodiments, a computing system generates the offset table using a custom generated or preconfigured dictionary (e.g., dictionary 1510 for a collection comprising text information 1500). FIG. 15C shows an example offset table 1520 identifying a position for each term identified within a collection (e.g., using the dictionary 1510). In this example, the offset table 1520 includes a document number column 1541 identifying a location for each word in a document. In this case the sentences came from the same document (document 1). The offset table 1520 includes a sentence number column 1542 identifying a location for each word in a sentence of the document. For instance, words in the set 1522 are identified as being from the first sentence with a numerical indicator of 1. Words in the set 1524 are identified as being from the second sentence with a numerical indicator of 2. The offset table 1520 includes a token number column 1543 identifying a location for each token within its respective sentence (i.e. by assigning a unique token identifier unique within the sentence). The offset table includes a word column 1544 identifying the characters within a token string.

Additionally, or alternatively, the computing system computes a term-by-term table for each set of the collection indicating each term within a respective set from the offset table. FIG. 16A shows an example term-by-term table for the text information in FIG. 15A. Each set of the collection appears as headers of a row and column of the table. As shown replicated terms within a row or within a column for a given set are excluded. This ensures all terms in the table are unique within the set. For example, as shown in FIG. 16A, words in the set 1610 are a subset of words from set

1522 of FIG. 15C excluding repeated words (e.g., "cat" only appears one time in the set 1610 but appears twice in the set 1522). As shown, the terms table comprises numerical indicators of a frequency of co-occurrence of a given pair of terms within a set. For instance, the term "that" in set 1610 co-occurs with the word "cat" 2 times in the first sentence. In other embodiments, the terms table is a sparse table that may not include word pairs where the frequency is 0.

In an operation 1454, the computing system generates computed probabilities based on the one or more co-occurrence scores for the first set. Each of the computed probabilities indicate a likelihood that one term in a given pair of terms of the collection appears in a given set of the collection given that another term in the given pair of terms of the collection occurs. For instance, if a term pair contains the words "apple" and "skin" in a collection comprising sentences of a food report, there may be a 50% likelihood if the term "apple" appears in a sentence of the food report that "skin" will also appear in the sentence of the food report.

In an operation 1455, the computing system smooths the computed probabilities by adding one or more random observations. For instance, the computing system may receive a parameter from a user of the computing system indicating a default level of random observations and adds the default level of random observations. For instance, the default level could be a numerical indicator of random observations. By smoothing the computer probabilities, one or more embodiments better account for disparities in frequency caused by more common word pairs because the words of the pair are more common versus rare word pairs because the words of the pair are rare.

In an operation 1456, the computing system generates one or more association indications for the first set based on the smoothed computed probabilities. For instance, a respective association indicates an association between a respective pair of terms within a set. The computing system may generate an association measure which is a modified normalized pointwise mutual information score based on the smoothed computed probabilities. The association measure can be used to generate the one or more association indications, or the association indications may indicate an association measure.

In one or more embodiments involving methods described herein, additional, fewer, or different operations can be performed depending on the embodiment. For instance, the method 1400 could optionally include an operation 1452 for computing a first weighting. The first weighting is one of variable weights for the first set that varies based on a respective distance between a respective pair of terms within the first set. Additionally, or alternatively, the method 1400 comprises an operation 1453 for weighting a given co-occurrence score for the first set by applying the first weighting to the given co-occurrence score for the first set. One or more embodiments employing a weighting can better account for sentences that may account for sets of collection with different lengths (e.g., sentences).

Although some of the operational flows in methods described herein are presented in sequence, the various operations may be performed in various repetitions, concurrently (in parallel, for example, using threads and/or a distributed computing system) and/or in other orders than those that are illustrated. For instance, the computed probabilities are shown as occurring after the weighting. In this situation, the generated computed probabilities are based on the one or more co-occurrence scores that have been weighted. In other examples, the computed probabilities could occur after the weighting.

In one or more embodiments, data pertaining to the set is distributed across nodes in a computing network, so that each node contains a subset of the total collection (e.g., a document domain). For example, each node may parse the data so that the output data contains one row per term observed in each document in the order that the terms occurred. This output could be generated using SAS® Text Parsing provided by SAS Institute Inc. of Cary, N.C. or other parsing software tools (e.g., tools that tokenize, or separate, words or tools that tokenize, or separate, sentences). FIG. 16B illustrates an example node input output from a parsing node (e.g., parsing node 1304) for the term-by-term table in FIG. 16A.

In one or more embodiments, a computing system receives one or more settings for calculating the frequency of co-occurrence of a term i and a term j within a set (e.g., settings 1370). For instance, the settings could comprise an instruction whether to consider a particular order of the term i and the term j. In FIG. 16A the example order did matter (e.g., a variable order_dependent=true). If instead the settings had indicated that the terms could appear in any order, most of the scores would be double. For example, "The" in set 1610 co-occurs with cat twice when order does matter, but four times if counted again when the computing system processes each "cat" term associated with set 1610.

Additionally, or alternatively, the settings comprise an instruction indicating whether term i and term j can be the same term. For example, in FIG. 16A, there is no score for a co-occurrence between "cat" and "cat". Additionally, or alternatively, the settings comprise a maximum value for a given co-occurrence score in the first set. In this case the sentence was short. However, machine data could be long with many repeated terms. Additionally, or alternatively, the settings comprise a variable parameter indicating a maximum distance between ordered terms. For example, as shown in FIG. 16A, if the maximum distance is set to 5, cells in term-by-term table 1600 denoted with an asterisk have a lower value because other matches were two far away. In one or more embodiments, some sets of a collection may have ordered terms of a length shorter, the same length, or longer than the maximum distance between ordered terms.

FIG. 16B illustrates an example input to a node regarding a single term "that". More terms could be provided to a node for processing or terms could be processed on different nodes. A distance column 1635, indicates the k distance between terms in column 1631 and column 1632. In this example, the table 1630 includes a distance column 1635 indicating the distance between terms in number of tokens (where 1 means they are adjacent to each other). Other identifying information could be included. The table 1630 includes a sentence number column 1633 indicating the sentence that the term pair was found. The table 1630 includes a document number column 1634 containing a document identifier of the document containing that term pair. In this case order of the term pairs did matter. If order of the term pairs did not matter, each term pair would appear twice: once as <term 1, term 2> pair and as a second time as <term 2, term 1> pair. For each term in this example, there is also a special null relationship output used to represent the term by itself.

In one or more examples, a computing system (e.g., one or more association nodes 1306) receives one or more variables for weighting a co-occurrence score (e.g., a variable λ where 0≤λ≤1). FIG. 16C illustrates example weighted co-occurrence scores. In this example, term pairs including "that" are weighted with a λ=0.5 according to the equation:

$$w_{ij} = 1/\delta^\lambda,$$

where δ is a distance between term i and term j of the respective pair of terms (e.g., a distance in number of intervening tokens between term i and term j of the respective pair of terms).

In one or more embodiments, the computing system increases processing ability of the computing system by distributing score data across nodes in the network grouped by term identifier so that a single node handles the same terms in a given term's column for weighting that term. Additionally, or alternatively, the output is stored sparsely (with only non-zero outputs stored).

In one or more embodiments, the computing system generates computed probabilities for a set by multiplying each of co-occurrence scores (e.g., weighted co-occurrence scores) of the one or more co-occurrence scores of a set by a constant c such that an average of the one or more co-occurrence scores for the set corresponds to a particular value (e.g., a value of 1 according to the below equations).

$$X'_{ij} = \Sigma 1/\delta^\lambda$$

$$c = \Sigma_{i,j} X_{ij} / \Sigma_{i,j} X'_{ij}$$

FIGS. 17A-17E illustrate example generation of association indications. In this example, weighting was not performed or λ was set to zero. In this case c would be equal to "1" and could either be used or also excluded. The operations described with respect to FIGS. 17A-17E could have been performed on weighted co-occurrence scores. The association indications for term i and term j or ($A_{ij}$) were computed according to equation (1):

$$A_{ij} = \frac{\log(P_i P_j)}{\log(\hat{P}(i, j))} - \frac{\log(P_i P_j)}{\log(\hat{P}(i, j) \mid X_{ij} = 0)} \quad (1)$$

where:

$\|D\|$ is a number of sets of ordered terms in the collection;

$X_i$ is a number of sets in which term i occurred in the collection;

$X_j$ is a number of sets in which term j occurred in the collection;

m is a number of random observations;

$$P_i = \frac{X_i}{\|D\|};$$

$$P_j = \frac{X_j}{\|D\|};$$

$X_{ij}$ is a number of times terms i and j occur in the first set of the collection; and $$\hat{P}(i, j) = \frac{(X_{ij} + m P_i P_j)}{\|D\| + m}.$$

A highly correlated association indicator would be at a maximum value for equation (1) of 2 and a low correlated association indicator would be close to a minimum value for equation (1) of 0.

FIG. 17A shows calculated probabilities P of a term i occurring and a term j occurring for each of tokens 1-10 of the term-by-term table 1600 in FIG. 16A.

In one or more embodiments, a computing system calculates a "smoothed" $\hat{P}(i,j)$ for each pair (row, column combination) in the matrix of term-by-term table 1600. FIG. 17B shows a table 1720 with smoothed $\hat{P}(i,j)$ with m=1 and $\|D\|$=4 (assuming four sentences with the sentences of text information 1500 and two other sentences in the collection, which have none of the words of sentence 1 and sentence 2). If m=0, no smoothing occurs, and the probabilities are all either 0.25 (occurs in one of the documents) or 0.5 (combination occurs in two of the documents). With m=1, all probabilities are now decreased: from 0.5 to 0.375 and from 0.25 to 0.198 or 0.156, depending on the baseline probabilities.

Figures 17C, 17D:
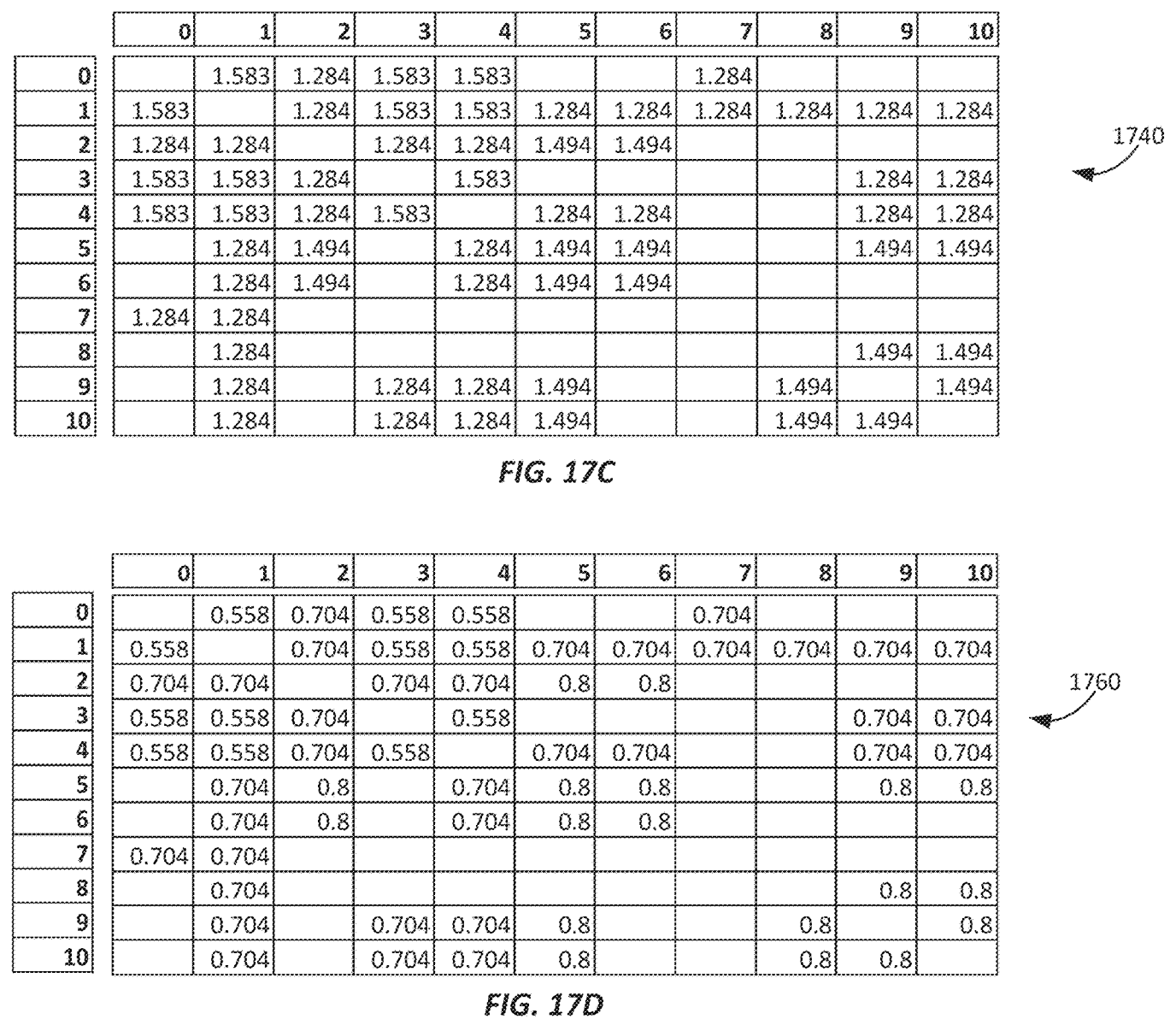

In one or more embodiments, a computing system generates an association measure which is a modified normalized pointwise mutual information (NPMI^) score based on the smoothed computed probabilities rather than actual probabilities. FIG. 17C shows generated association measures in table 1740. These association measures correspond to equation (2) below.

$$\frac{\log(P_i P_j)}{\log(\hat{P}(i, j))} \quad (2)$$

As shown in FIG. 17C the more related two numbers are, the higher the correlation. With m=1 (default), the correlations do not appear very big because the numbers are small, so the smoothing is great in relation to the data in this example. If a user sets m to 0.01, then the numbers are close to the unsmoothed numbers.

The NPMI^ improves upon traditional pointwise mutual information that, unlike mutual information, does not weight the results by co-occurrence frequency. This means that rare term co-occurrence is weighted more strongly than common term co-occurrence. Further, additive smoothing is not found in traditional applications of pointwise mutual information. Additive smoothing also does not traditionally use combined conditional probabilities as in this example.

In one or more embodiments, a computing system shifts an association measure by a variable pseudocount based on how common the term pair is within a collection of data. In one or more embodiments, the pseudocount corresponds to equation (3) below. FIG. 17D shows calculated pseudocounts in table 1760 of the correlations. A variable pseudocount is an improvement on techniques that may merely shift an association measure by a constant value (e.g., to affect the range of the values).

$$\frac{\log(P_i P_j)}{\log(\hat{P}(i, j) \mid X_{ij} = 0)}.$$

In one or more embodiments, shifting is used to account for cells where there is no correlation (i.e. blank cells in the table 1760). In textual analytics, blank cells could be 90% to 95% of all the cells in a matrix because of the amount of possible terms and virtual terms. Blank cells will generally represent negative correlations, but how negative? For terms that are very common, if they never occur together, they are very negatively correlated. But if the two terms in question both occur very rarely, even the expected number of times they occur together in a large document collection could be much less than one. In that case, a blank cell would be more indicative of no correlation than a negative one. Equation (3)

above accounts for what a modified NPMI (NPMI^) score would be if its frequency were 0 rather than the value it is (i.e. Xij=0).

Figure 17E:

FIG. 17E shows association indicators in table 1780 calculated according to equation (1) (i.e. subtracting the values in the matrix shown in table 1760 from table 1740. In this example, the missing elements would all calculate to 0 if they were calculated, so doing a matrix factorization which assumes those values as 0, like a sparse Singular Value Decomposition (SVD), works well.

In this example, the results were all positive. However, in one or more embodiments, the factors may be weighted so that they are all positive and/or monotonically scaled, which may be useful for factoring the resulting matrix of association indications (e.g., shown in table 1760). For instance, optionally weighting the correlations so that as the value approaches 1 or −1, the smoothed correlations are much more strongly weighted than when they are closer to 0. Raising the values in table 1760 to a power, p>1 guarantees the results to all be positive and monotonically scaled. In one or more embodiments, a cutoff can be used based on the scaled values (considering any values>=1 to be a significant positive term relationship).

In one or more embodiments, a computing system outputs one or more association measures shown in FIGS. 17A-17E as an association indication. Alternatively, or additionally, topic information may be output to indicate associations. For instance, a transformation can be used to generate a dense terms matrix ($A_k$) shown in FIG. 17F (e.g., using Singular Value Decomposition). As shown in 17F, the term-by-term table 1790 is decomposed and transformed to a dense terms matrix ($A_k$) 1798. One or more components of this decomposition can then be "rotated" into interpretable dimensions, maximizing the sums of the weights of the individual terms projected onto each axis. For instance, $U_k$ matrix 1794 is a truncated dense matrix of term projections. This can be multiplied by $\Sigma_k$ matrix 1796 and rotated into interpretable dimensions. For instance, the new axes of these dimensions can then be considered as "topics". Topic information may then be output to indicate the associations.

FIG. 18 illustrates example generation of association indications on 50,000,000 words parsed from a dataset derived from a collection of publicly available webpages comprising 3,472,222 sentences. The first ten word pairs in set 1810 of table 1800 are the strongest correlated terms, of those occurring at least 1,000 times in the dataset. The second ten in set 1820 are those that have the weakest correlations of those occurring at least 1,000 times in the dataset. Techniques herein help distinguish meaningful associations as opposed to just words that co-occurred a lot together because they are often used words in the English language (e.g., articles such as "the" and "a"). The count word column 1830 shows that these weaker correlated words occurred more often and in some cases as shown in the co-occurrence count column 1831, co-occurred frequently. The words "it" and "the" had one of the highest co-occurrence scores in co-occurrence count column 1831. Columns in set 1832 shows calculations according to equation (1) resulting in association indicators in term correlation value column 1833. Ten random observations were added according to equation (1) (i.e. m=10). In this example, the values were also raised to a power of 3 in raised-to-power column 1834 or shown as a percentage in alternative column 1835. Any of these different ways to represent the association could be output as an association indication.

FIG. 19 illustrates a table 1900 of example generation of association indications for generated data to show performance of techniques described herein for edge cases. For instance, word 14 and word 15 represents two words that occur in every sentence but never in cooccurrence relationship with each other showing a value of 0 in count of co-occurrence column 1931. In contrast, word 10 and word 12 represent the opposite case, where the two terms are in all the data and almost always cooccur with an association score of 1.999999 out of maximum of 2 for the association indications in term correlation column 1933.

Table 1900 shows improvements of described techniques over traditional approaches to determining association or correlation between terms. Traditional approaches used a normalized pointwise mutual information equation between two terms. This traditional approach attempted to create a "correlation-like" number between −1 and 1 that measures the association of two words based on their frequency of cooccurrence according to equation (4).

$$npmi(i, j) = \frac{pmi(i, j)}{-\log(P_{ij})} = \frac{\log(P_i P_j)}{\log(P_{ij})} - 1 \qquad (4)$$

NPMI Column 1932 of table 1900 shows NPMI values for each of the edge cases. Word pairs word 3 and word 5 (3,5); word 1 and word 2 (1,2); and word 6 and word 7 (6,7) each had the same score (an NPMI score of 1) even though their observed frequency was different as shown in count word column 1930. Ideally, large amounts of evidence of correlation should be weighted higher than smaller. Intuitively, these word pairs should not have the same association score. By smoothing the estimate and adding random observations as described herein, claimed embodiments can better reflect these different amounts. For instance, as shown calculations for modified NPMI (e.g., alt NPMI^ column 1936) distinguish between these frequencies with higher association scores awarded to (6,7) who had a higher frequency count than (3,5) that had a lower frequency count in count word column 1930. Ultimately the association score in term correlation column 1933 also accounts for what a modified NPMI (NPMI^) score would be if the frequency is 0 as shown in NPMI^(Xij=0) column 1937. The values in association indications shown in the term correlations column 1933 show a distinction between these word pairs of different frequency with higher association scores awarded to (6,7) than to (1,2) and (3,5). By raising the values in the term correlations column 1933 to a power of 3 in the raised-to-power column 1934, the distinction is increased. The distinctions can also be represented as a percentage in percentage column 1935.

Word pairs word 1 and word 3; word 6 and word 4; and word 9 and word 6 demonstrate cases where a frequent term (like an article) is combined with a rare term, but there is full overlap whenever the rare term occurs. In this case, the least frequent (and lower evidence) examples show reversing order in terms of significance with word pair word 1 and word 3 having a lowest co-occurrence score in co-occurrence column 1931, but a higher NPMI score in NPMI column 1932. Techniques herein reverse that trend as shown in term correlation column 1933, raised-to-power column 1934, and percentage column 1935.

No NMPI score is possible, when words never occur together as shown for word pair word 14 and word 15 with no value in the NPMI column 1932. A common way to deal with this problem is just to ignore cells that produce a negative association value, which is called Positive Pointwise Mutual Information (PPMI). Ignoring negative correlation information seems reasonable for rare words, but for common words, this is a lot of information to throw away. By using a modified NPMI (NPMI^) technique, embodiments herein can provide an appropriately low score (e.g., as shown in alt NPMI^ column 1936). For instance, percentage column 1935 shows a score of a true "0" value for no correlation or association.

In one or more embodiments, computed association or correlation indicators are output as an indication of a dataset of associations. Alternatively, or alternatively, other indications may be output. For instance, the association indicators can be used to determine or select candidates for virtual terms that often cooccur together. These virtual terms may be meaningful to look at or parse data for on their own (e.g., "river" and "bank" or "German" and "cake"). In one or more embodiments, a computing system (e.g., computing system 1300) outputs terms that exceed a certain smoothed term correlation value (e.g., that exceed the value 1) as candidates for virtual terms. Additionally, or alternatively, virtual terms are output that show strong correlations with one of the topics identified in the singular value decomposition, or show strong correlations, or mutual information with some other variable in the data. These virtual terms can then be implemented as additional terms in and of themselves. Virtual terms are also useful for analyzing terms, mapping terms and building rules using terms (e.g., concept and category rules).

Figure 20:
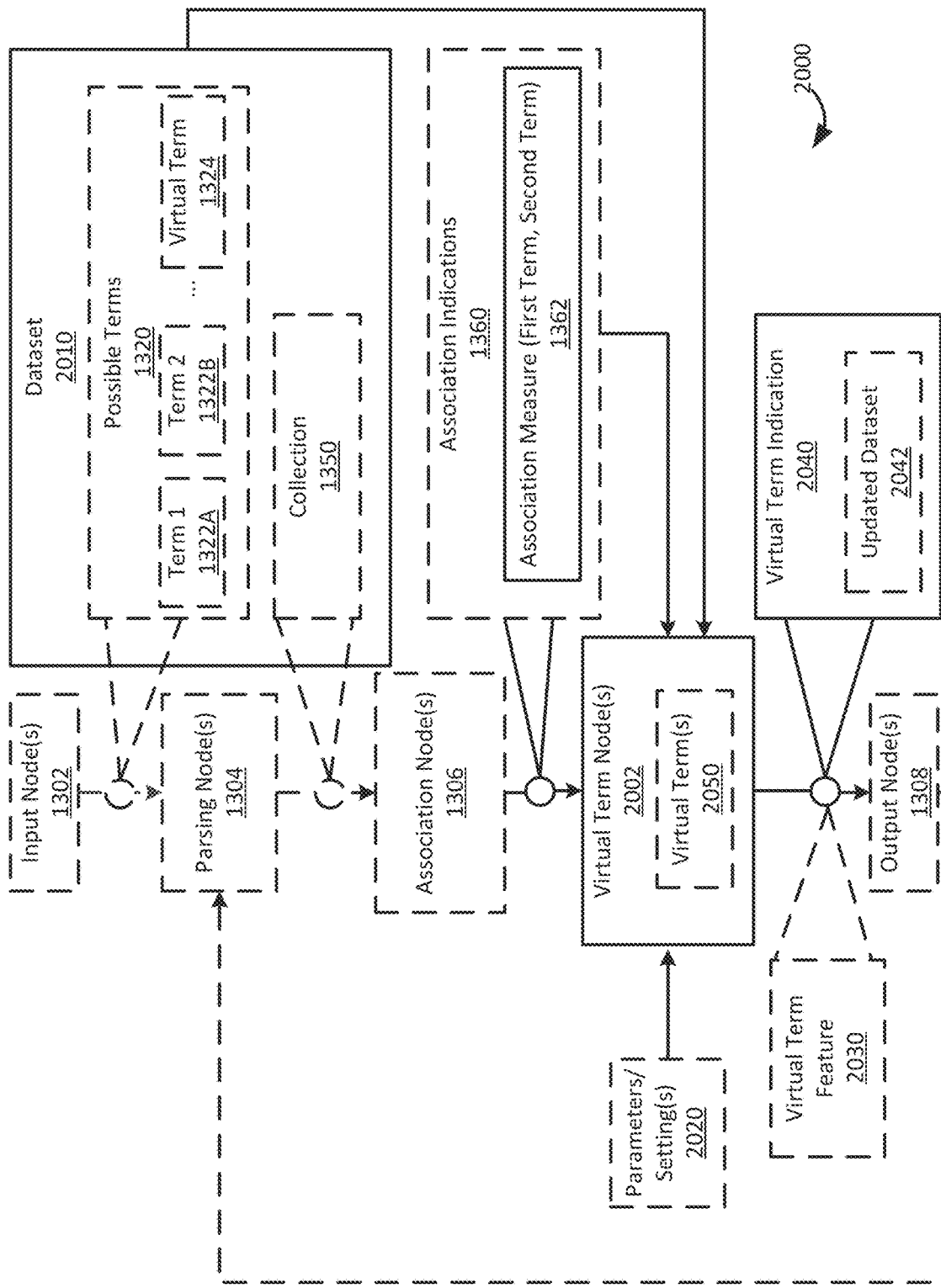
FIG. 20 illustrates a block diagram of a computing system for generating virtual terms in at least one embodiment of the present technology.

FIG. 20 illustrates a block diagram of a computing system 2000 for generating virtual terms. In one or more embodiments, the computing system 2000 is the same or different from computing system 1300. For instance, in one or more embodiments, the computing system 2000 comprises one or more components, features, or computing devices of computing system 1300 (e.g., one or more input nodes 1302, one or more parsing nodes 1304, one or more association nodes 1306, and one or more output nodes 1308). Alternatively, the computing system 2000 comprises different components, features or computing devices for generating virtual terms (e.g., one or more virtual term nodes 2002).

In the example, the computing system 2000 receives a dataset 2010 of a dictionary of possible terms. In one or more embodiments, the computing system 2000 receives the dataset 2010 using one or more nodes of the computing system 2000 (e.g., input nodes 1302, parsing nodes 1304, association nodes 1306, or virtual term nodes 2002). The dataset 2010 is for identifying one or more of the possible terms in data that comprises ordered terms. For instance, the dataset 2010 could comprise possible terms 1320 shown in FIG. 13 (e.g., terms or virtual terms that may be found in the collection 1350. Alternatively, or additionally, the dataset 2010 could comprise the collection 1350 shown in FIG. 13 identifying possible terms in data comprising ordered terms (e.g., a collection 1350 produced by one or more parsing nodes 1304). Alternatively, or additionally, the dataset 2010 comprises the possible terms 1320 modified by the collection 1350. For example, if the collection 1350 relates to mechanic notes, the possible terms 1320 may be reduced by a user or a node in computing system 2000 to a subset of possible terms pertinent to mechanic notes. In one or more embodiments, one or more virtual term nodes 2002 receive the dataset 2010 from a user, another node in the computing system 2000, or another computing system.

In one or more embodiments, the computing system 2000 obtains one or more computer-generated association measures. Each association measure is an association between a pair of terms from a plurality of identified terms of the possible terms 1320 that were identified in data (e.g., in collection 1350). For example, one or more association nodes 1306 may generate association indication 1360 indicting one or more of the computer-generated association measures (e.g., association measure 1362 of an association between an identified first term and a second term). These association measures could be generated by embodiments described herein. Alternatively, or additionally, the association measures can be obtained from another computing system or user. One or more virtual term nodes 2002 may receive the generated association indication 1360 indicting the one or more of the computer-generated association measures.

The computing system 2000 generates, based on one or more of the obtained computer-generated association measures, one or more virtual term(s) 2050. For instance, a virtual term may comprise a single term that specifies a first term (e.g., Term 1322A) and a second term (e.g., Term 1322B) that co-occur a variable distance apart. In one or more embodiments, the computing system 2000 generates multiple virtual terms 2050 and the computing system selects a subset from the multiple virtual terms (e.g., virtual term 1324).

The computing system 2000 outputs an indication 2040 to include one or more virtual terms 2050 in the dataset of possible terms (e.g., a subset of virtual terms). For instance, the computing system 2000 may output an updated dataset 2042 for the dataset 2010. The updated dataset 2042 may include a virtual term. It may include other possible terms (e.g., possible terms 1320). Alternatively, or additionally, the computing system may append the virtual term to a dataset of possible terms (e.g., dataset 2010, or possible terms 1320).

In one or more embodiments, the computing system 2000 receives parameters 2020 (e.g., parameters or thresholds for selecting virtual terms). For example, the computing system 2000 may receive a threshold score for the computer-generated association measures. The computing system may compare the computer-generated association measures of corresponding multiple generated virtual terms 2050 to a threshold and select virtual terms that exceed the threshold.

Alternatively, or additionally, the computing system 2000 may receive a parameter indicating an amount of allowed virtual terms. This amount may be relative to the amount of possible terms 1320 (e.g., a ratio of a number of the possible terms 1320 to a number of allowed virtual terms). If the number of generated multiple virtual terms 2050 (or ones that exceed a threshold) exceeds the number of allowed virtual terms, the computing system 2000 may select a subset of the multiple virtual terms that is equal to or less than the number of allowed virtual terms. The computing system 2000 may select the subset based on comparing the computer-generated association measures (e.g., ranking the measures and selecting terms for a virtual term that had the highest association measures in the ranking).

Alternatively, or additionally, the computing system 2000 may use a machine learning algorithm to select a subset of the plurality of virtual terms. For example, the computing system 2000 may receive a target variable for a supervised machine learning algorithm. The computing system may execute the supervised machine learning algorithm to select, based on the target variable, a subset of the multiple virtual terms 2050.

Alternatively, or additionally, the computing system 2000 may select a subset of virtual terms by determining correlations between individual virtual terms of the multiple virtual terms and topics. For example, the topics could relate to relevance to a context in which it would be useful to have virtual terms (e.g., relevance to tools, in a collection related to mechanic notes). The computing system 2000 may select a subset of the multiple virtual terms 2050 based on the correlations.

In one or more embodiments the computing system 2000 (e.g., one or more virtual nodes 2002) generates one or more virtual term features 2030. A virtual term feature 2030 could be associated with a generated virtual term (e.g., a tag for that virtual term). For instance, a virtual term feature 2030 could comprise a correlation with one or more possible options (e.g., predefined options for a topic, category, sentiment or meaning). If that virtual term is found in a subsequent collection, that feature could indicate something about the virtual term (e.g., its meaning within the dataset) or something about the collection or aspect of the collection (e.g., a category for the collection).

In one or more embodiments, the computing system 2000 can provide an indication 2040 to the computing system (e.g., to one or more parsing nodes 1304) for adding the virtual term to a dataset of possible terms (e.g., possible terms 1320). The computing system 2000 can then parse new data (e.g., data comprising one or more different terms or a different term ordering) for an added virtual term (e.g., virtual term 1324). When new data is received by the computing system, the computing system 2000 may identify the virtual term in the new data according to the generated dataset; and identify one or more features about the new data based on the one or more features for the virtual term.

In one or more embodiments, the virtual term specifies more than two terms that co-occur in the data. For instance, the computing system 2000 can generate further virtual terms based on a data set of possible terms 1320 that includes an initial or previously added virtual term (e.g. virtual term 1324). The computing system 2000 obtains a computer-generated association measure of an association between the initial virtual term (e.g., virtual term 1324) and another term of the generated dataset (e.g., term 1322 or another virtual term). Based on the obtained computer-generated association measure, the computing system 2000 generates an additional virtual term that specifies the initial virtual term and another term that co-occurs in the data a variable distance apart. The association indication 1360 may indicate to include the additional virtual term in the dataset of possible terms. This way virtual terms can accumulate to more than just two contributing terms.

Figure 21:
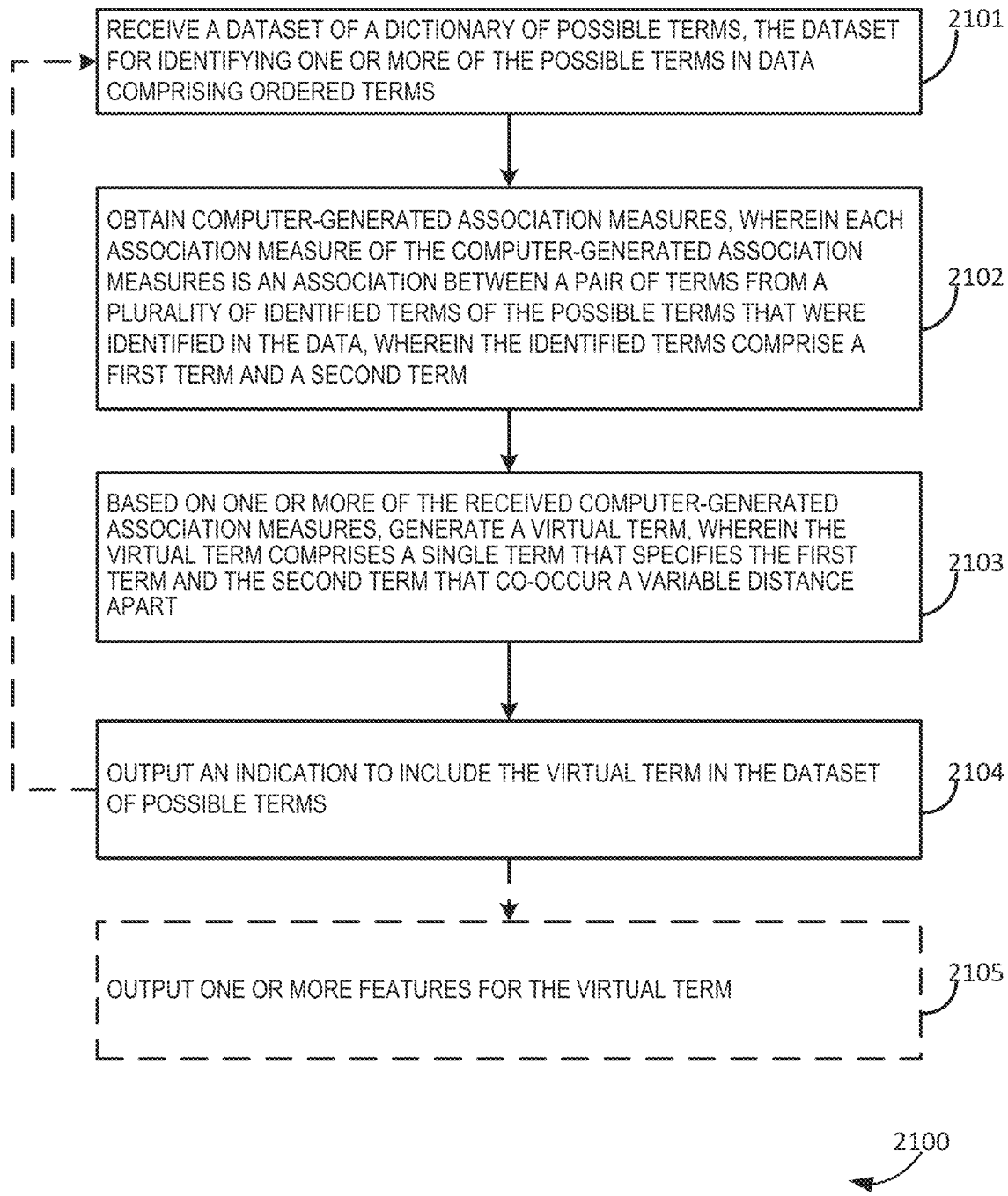
FIG. 21 illustrates a flow diagram for generating one or more virtual terms in at least one embodiment of the present technology.

FIG. 21 illustrates a flow diagram for a method 2100 for generating a virtual term. The method 2100 could be implemented by a one or more nodes described herein (e.g., in computing system 1300 or computing system 2000).

The method 2100 illustrates an operation 2101 for receiving a dataset of a dictionary of possible terms for identifying one or more of possible terms in data comprising ordered terms. For instance, the data is text information (e.g., text information 1312).

The method 2100 illustrates an operation 2102 for obtaining computer-generated association measures. Each association measure of the computer-generated association measures is an association between a pair of terms. The terms are from a plurality of identified terms of the possible terms that were identified in the data. The identified terms comprise a first term and a second term. For instance, the terms could be words identified within a sentence or clause of the text information.

The obtained computer-generated association measures may be generated as described herein. Alternatively, or additionally, the computer-generated association measures may be received from a computing system that generates association measures as described herein. For instance, the computer-generated association measures may be based on a frequency of co-occurrence of each pairs of the possible terms that were identified in the data as described herein. Additionally, or alternatively, the computer-generated association measures may be based on a variable weighting based on a distance between terms of a respective pair of the multiple identified terms.

The method 2100 illustrates an operation 2103 for, based on one or more of the obtained computer-generated association measures, generating a virtual term. The virtual term comprises a single term that specifies the first term and the second term that co-occur a variable distance apart.

The method 2100 illustrates an operation 2104, for outputting an indication to include the virtual term in the dataset of possible terms (e.g., virtual term indication 2040).

In one or more embodiments, the method 2100 comprises an optional operation 2105 to output one or more features of the virtual term (e.g., a meaning for the virtual term or a prediction about the text the virtual term would appear in).

Figure 22:
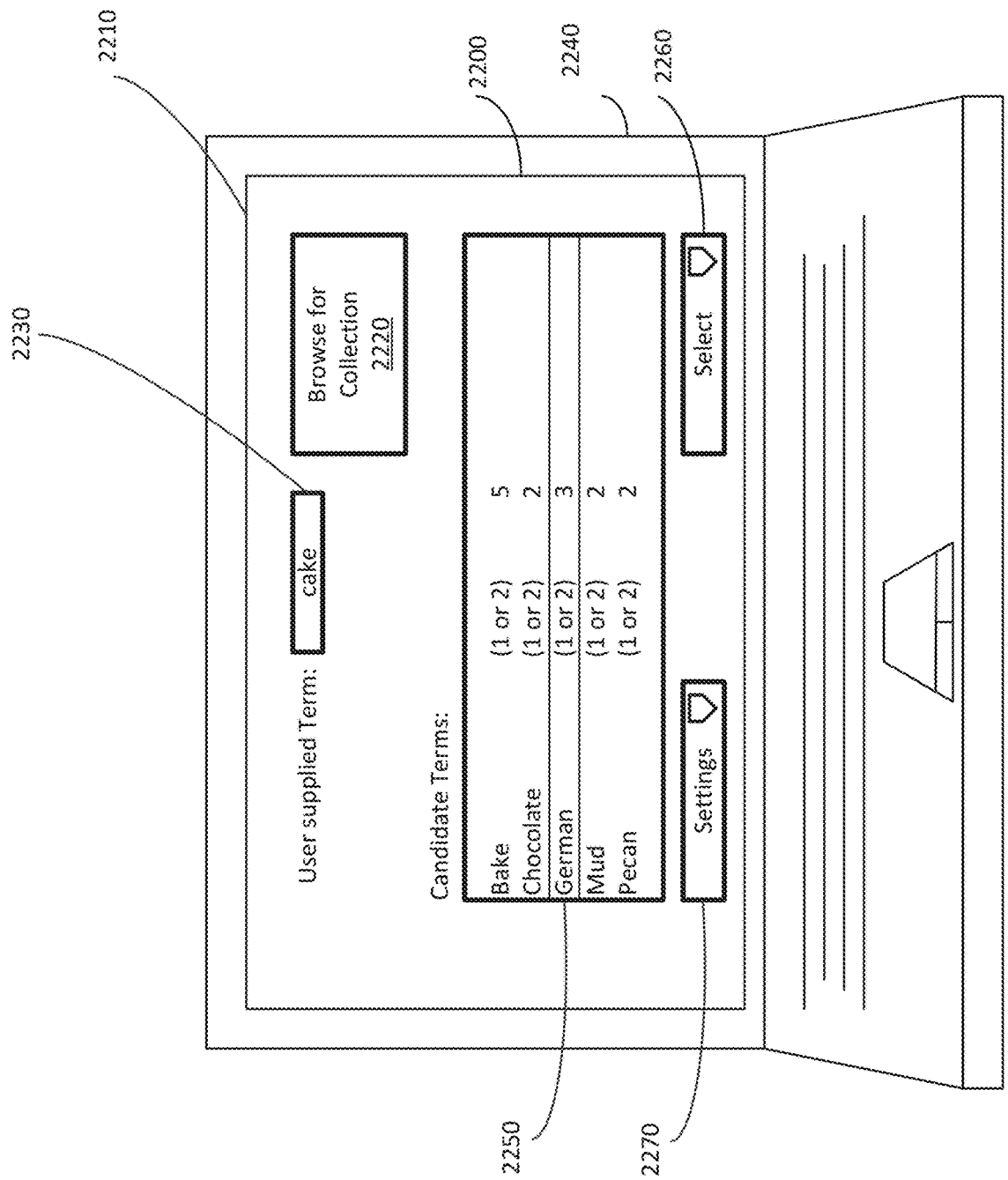
FIG. 22 illustrates a graphical user interface in at least one embodiment of the present technology.

FIG. 22 illustrates a graphical user interface 2200 on a display device 2240. The graphical user interface 2200 may be used for the user to control computer generation of association measures or virtual term. The graphical user interface 2200 may be used for a user to browse for data on the computing system (e.g., computing system 1300 or 2000) for generating association measures or virtual terms (e.g., by using the browse for collection control 2220). It may also be used to input settings described herein (e.g., using settings control 2270). For instance, the settings may be used to indicate that words with similar stems should be treated the same or should be treated differently. If they are treated the same a first term may indicate multiple terms of the same stem. Alternatively, or additionally the settings may set a maximum distance between words of a virtual term.

Alternatively, or additionally the computing system may receive from a user input or selection of terms of a virtual term. For instance, the computing system may receive a user identification of the first term (e.g., by inputting it in textbox 2230 in graphical user interface 2200). The computing system displays, on a display device (e.g., display device 2240), candidate terms for the virtual term (e.g., in a text box 2250). The computing system receives, from the user of the computing system, a user selection of the second term (e.g., by selecting a second term such as "German") and using the select control 2260. The computing system generates the virtual term based on the user input and selection of virtual terms.

The virtual term may specify an ordering for the first term and the second term (e.g., German could be the first term or the second term). Alternatively, or additionally, the virtual term may specify a maximum distance between the first term and the second term (e.g., "German" is found within 3 words from "cake"). In this example, the user may use this information to select virtual terms (e.g., eliminating "bake" because it may be too far apart from cake) or modify a setting (e.g., change "5" to a closer number "3" or require a candidate term to be the first identified term or the second identified term in identifying the terms of the virtual term).

Figure 23:
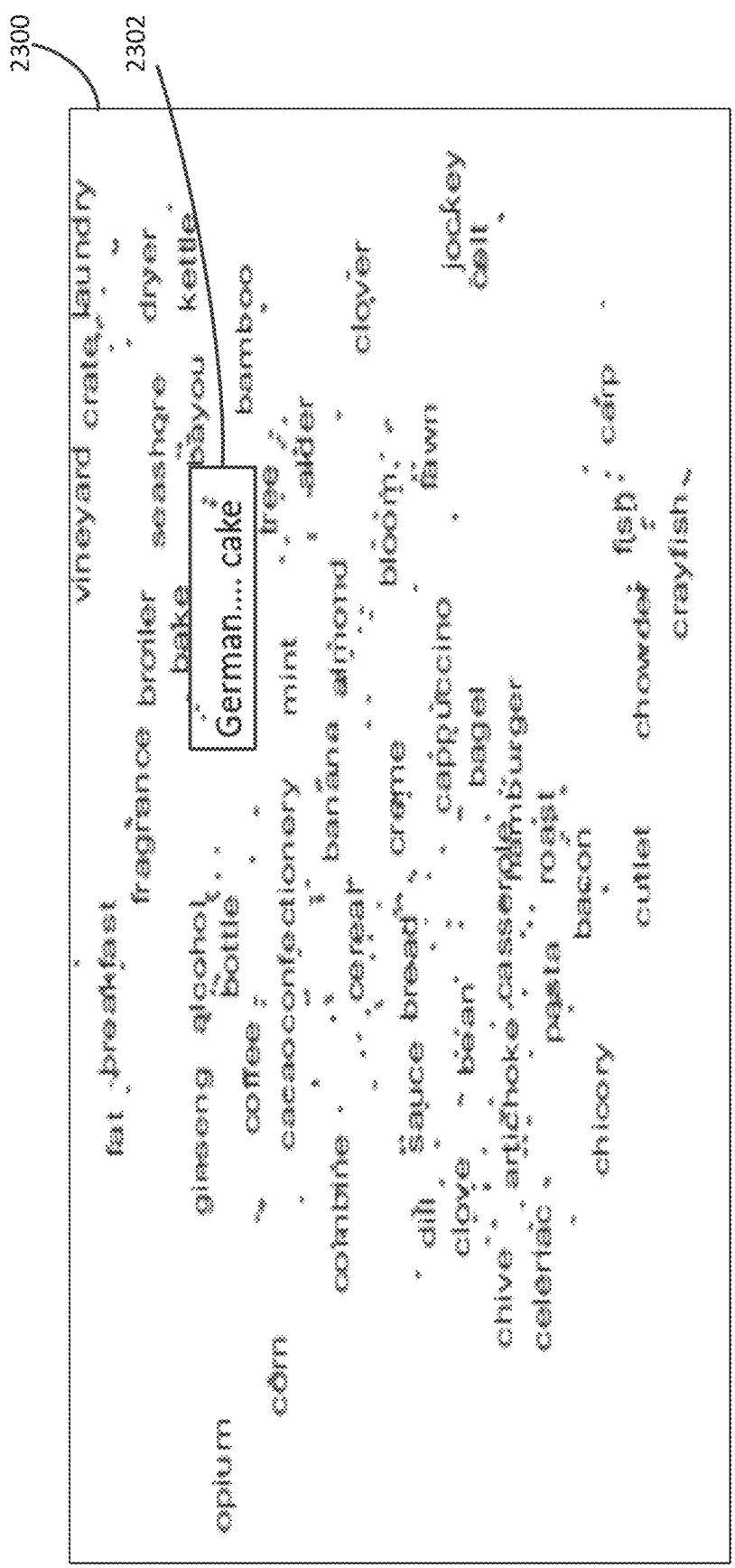
FIG. 23 illustrates a word embedding with a virtual term in at least one embodiment of the present technology.

FIG. 23 illustrates a word embedding 2300 with a virtual term 2302. There has been substantial work in recent years on distributional semantics, which relies on the "distributional hypothesis": loosely put, "you shall know words by the company they keep". Distributional semantics generally assumes that one can map words to vectors in a multi-dimensional metric space, where the cosine of the angle between vectors indicates similarity of the corresponding words (if the vectors are normalized to have constant length, then Euclidean distance can also be used to relate terms). This mapping of words into a multi-dimensional space is generally referred to as generating word embeddings. For example, FIG. 23 shows an example word embedding 2300 on a topic related to food terms where the terms are separated in a multi-dimensional space.

SAS Institute Inc. of Cary, N.C. provides software for generating or working with word-embeddings. For instance, SAS® Text Miner and SAS® Viya® is useful for generating word-embeddings and SAS® Enterprise Miner™ is useful for modeling based on word-embeddings. Word embeddings are useful for of SAS® Text Clustering and Text Topic capabilities.

More information is possible when there is a joint "word embedding" and "document embedding". A computing system can rotate the dimensions of the space to align with strong directions and call the resulting axes "topics" providing interpretability to each of the dimensions. Alternatively, or additionally, the computing system can take the document embeddings, after suitably normalizing them, and feed them into any clustering or predictive modeling algorithm as predictor variables.

Figure 17F:
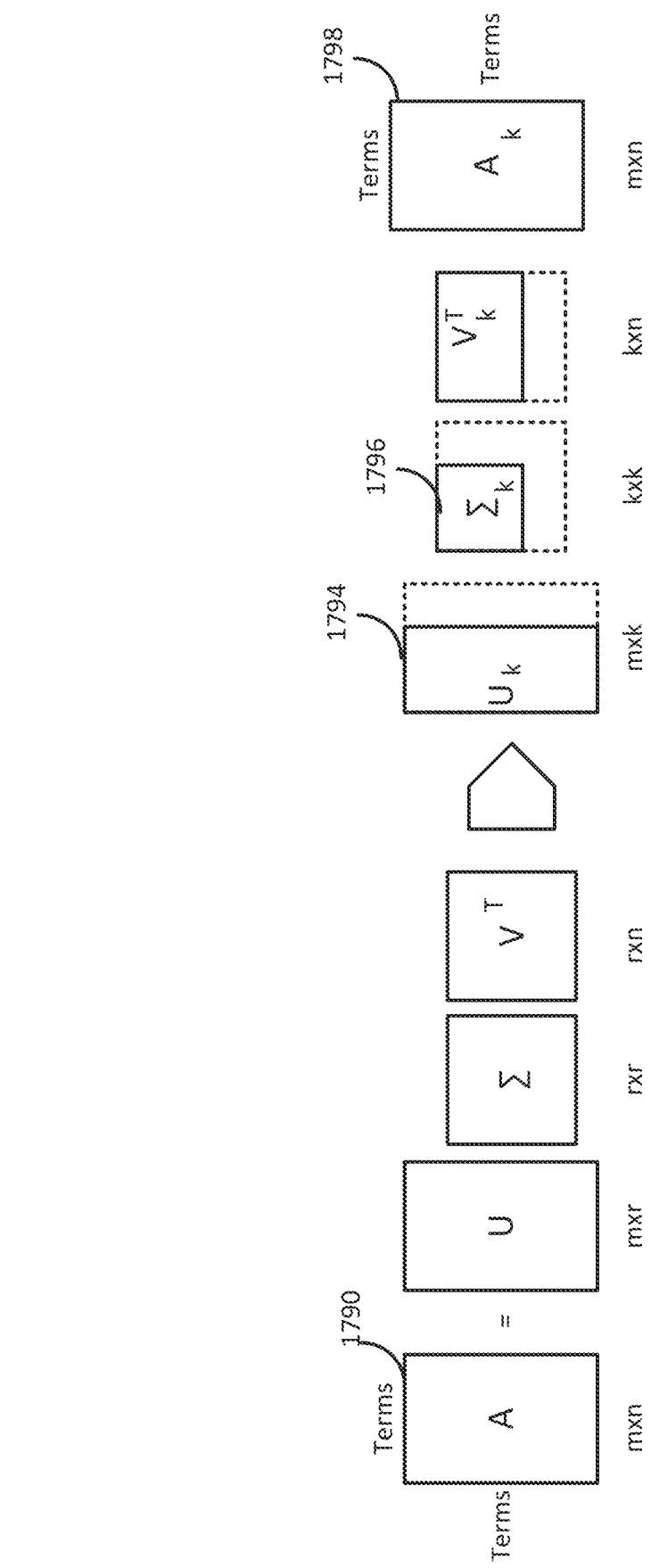
FIG. 17F illustrates an example singular value decomposition in at least one embodiment of the present technology.

Embodiments herein improve traditional SVD to factor a term-by-term occurrence matrix (e.g., as described with respect to FIG. 17F). In one or more embodiments, a computing system (e.g., one or more association nodes 1306) outputs an indication of the dataset by generating topic data or predictive modeling data based on a vector, or rotated vector, resulting from a term-by-term matrix. In one or more embodiments, the computing system generates the term-by term matrix for each set of a collection. The term-by-term matrix may be a sparse term-by-term matrix in that certain values are left out (e.g., zero values). The computing system can generate a singular value decomposition (SVD) of the (sparse) term-by-term matrix to generate the word embedding (e.g., word embedding 2300).

Further, embodiments herein improve word embeddings by including virtual terms (e.g., virtual term 2302). The following is example code used for generating word embeddings. It was performed by SAS® Viya® on a data set airlinefeedbackcat, which contains airline feedback comments.

```
%let sourceloc=\\tmdev\tmine\data\;
libname tm "&sourceloc";
/* Move documents from SAS table to CAS table */
data sascas1.airlinefeedbackcat;
  set tm.airlinefeedbackcat;
  id=_n_;
run;
```

First a computing system executing the code parses the data (e.g., by one or more parsing nodes 1304 described herein. Depending on options, the data can optionally include multi-word phrases such as noun groups or entities (e.g., person name and location). In addition, if tagging is used, words used as different parts of speech are treated distinctly. Neither of these capabilities are generally present in traditional approaches.

```
/* Parse documents using tmMine action */
proc cas;
  loadactionset 'textMining'; run; action
  tmMine;
    param
      docid="id"
      documents={ name="airlinefeedbackcat"}
      text="text"
      nounGroups=True
      quittagging=true
      entities="none"
      offset={name="offset", replace=True}
      terms={name="terms", replace=True}
      parseConfig={ name="config",replace=True}
      reduce=8
      stemming=True
      legacyNames=true;
  quit;
```

Then the computing system executing the code takes an offset table ("offset") which contains every term in every document that is parsed, in order, and the terms table ("terms") and feed those to the tmCooccur action. The tmCooccur action identifies how often each term pair occurs and calculates an association measure based on frequency of cooccurrence compared to expected frequency of cooccurrence.

```
/* Run tmCooccur action*/
proc cas;
  loadactionset "textUtil";
  action tmCooccur result=cooccur_res/ offset={name="offset",
    caslib="CASUSERHDFS"} terms={name="terms",
    caslib="CASUSERHDFS"}
    cooccurrence={name="cooccur", replace=True}
    cooccurrenceOffset={name="cooccur_pos",
    replace=True}
    maxDist=25
    minCount=1
    ordered=False
    smoothing 5
    xmax=100
    frequencyExponent=.6
    distanceExponent=.5
    useParentId=True;
  run; quit;
```

The parameters used in the example for the tmCooccur action are reasonable choices found in testing to be generally effective for generating embeddings.

The maxDist=25 parameter specifies that any word pairs that occur in this case more than 25 words apart in the same sentence will not be treated as a cooccurrence. This is important when sentence boundaries might be missing in some documents. This is also useful for modeling syntactic relationships. This distance could be very small (e.g., 3-5 words) for some applications.

The ordered=false parameter is useful for word embeddings where word order of the terms does not matter. An ordered=true parameters may be useful for creating statistics for when the first term (or row term) comes earlier in the sentence than the second term (or column term).

In the Mincount=1 parameter, the value of 1 indicates every pair of terms is considered since they cooccur at least once. If the computing system is processing a large collection, it may be useful to set a higher value for the Mincount parameter.

For the useParentID=true parameter, when the value is set to true, all term variations are equivalent to their stems and any synonyms in a synonym list are considered.

For the smoothing=5 parameter, this setting specifies the alpha smoothing parameter for additive smoothing applied to the counts of the cooccurrences of each term pair. If no smoothing is done (smoothing=0), then complete cooccurrence of two rare terms is considered equivalent to complete cooccurrence of two common terms in the correlation calculation, which is unrealistic.

The distanceExponent=0.5 parameter enables a computing system to weight term cooccurrences more strongly when the two words are close together in the sentence than when they are far apart. This value of 0.5 indicates that terms should be down weighted based on the square root of the number of words between them.

The frequencyExponent=0.6 parameter indicates how much the term correlation is weighted by the frequency of that cooccurrence to give the association value. Generally, the best results occur when the frequency is raised to an exponent of about 0.6. Using a frequency exponent greater than 0 guarantees that the most common term cooccurrences have the largest effect on the SVD factorization.

The Xmax=100 setting controls the maximum frequency that will be raised to the frequency exponent. Any cooccurrence frequencies in excess of this value will be weighted as if it was that value. Words that are very common frequently cooccur even though their cooccurrences are not that relevant and this parameter can help limit that affect.

Term embeddings are created by applying the SVD to the sparse term-by-term matrix of associations calculated by tmCooccur. In the code below, the tmSvd action performs the matrix factorization and projects the associations into a lower dimensional space of term rows (docpro) and term columns (wordpro). The tmSvd action can rotate these projections into topics like when a term-by-document matrix is fed in. In this example, the computing system is doing projections in 200 dimensions and also rotating the results to create topics:

```
/* Now create word embeddings using tmSvd action for
the term by term matrix created by tmCooccur action */
proc cas;
    loadactionset 'textMining';
    action tmSvd;
    param config="config"
        parent={name="cooccur",where="_Freq2_>=20" }
        term id="_Termid1_"
        docid="_Termid2
        _"
        count="_Associati
        on_"terms=
        "terms"
        timing=True
        rowPivot=0.7
        k=200
        norm="ALL"
        wordpro={name="word_a",replace=True}
        docpro={name="docpro_a",replace=True}
        topics={name="topic_a",replace=True}
        numLabels=7
        topicDecision=False u={name="svd_a",replace=True}
        scoreConfig={name="scoreconfig",replace=True}
        legacyNames=True ;
    quit;
```

The where="_Freq2_>=20" specifies only the term columns that occur frequently by setting a threshold on the frequency. This addresses problems in using a term-by-terms table rather than a term-by-document table. When the SVD is calculated on the term-by-document matrix, the wordpro table corresponds to the word projections and the docpro table corresponds to the document projections or the context in which those words occur. But when the computing system does a term-by-term matrix, they are both term projections.

Based on options for tmCooccur action, the matrix is symmetric and both output matrices will be the same (in that case, essentially it would be equivalent to a sparse principal component analysis). However, the rare term combinations found in the term-by-term matrix will dominate the projections, rendering the results less useful. To address both issues, the user specifies a frequency for the term columns.

The parameters to the tmCooccur action determine how the measure of association is calculated. In general, it is based on a modified normalized pointwise mutual (NPMI^) information score; the result can be considered as a correlation between the terms. That correlation is then optionally weighted by frequency.

One or more embodiments are also useful for document-level encodings and show improvements over traditional approaches to document-level encodings. Word embeddings themselves are useful for understanding how words relate to each other. For other applications it is useful to understand the document itself (e.g., for topic analysis, text categorization, or sentiment analysis).

FIG. 24 illustrates tables of performance to classify documents into different categories of techniques for document embeddings herein compared to traditional embeddings. The documents came from three data sets that had natural text categories: (1) an airline feedback data set regarding airline reviews (the categorical variable was the category of the feedback obtained); (2) a Newsgroup data set of news articles; and (3) NHTSA vehicle complaint data set from the first quarter of 2008 (the categorical variable was the component of the car that was being commented about).

The table 2400 shows aspects of the data sets. It includes a documents column 2404 indicating the number of documents in each data set; a categories column 2406 indicating the number of categories, and a baseline probability column 2408 (in this case, the percentage of documents in the most common category).

The table 2400 also shows performance comparisons for performance without virtual terms. For each data set, an autotuning neural network (autotune.tuneNeuralNet CAS action) with 10-fold cross validation was used to get an overall accuracy number. In all cases, 200 embedding dimensions were used. The final four columns show the accuracy obtained in classifying using (1) term-by-document SVD produced by SAS® Text Miner in column 2410; (2) a skip gram model in skip gram column 2412; (3) a sentence term-by-term SVD performed using a tmCooccur action according to embodiments described herein in column 2414; and (4) a document term-by-term SVD in column 2416.

A skip gram model is used to measure associations in short set contexts (e.g., within a 3-5 word window). In this example, the skip-gram model is based on a five-word context to both the left and right of a target word.

On the Newsgroups data, a slightly better result was obtained for the term-by-term SVD approach that used the co-occurrence of terms in a sentence. For the other two data sets, the best result was for the standard term-by-document factorization. In all three cases, the worst result was obtained from the skip-gram.

Perhaps by having a larger context, the term-by-document matrix has more information available to it. There are likely three reasons the skip-gram model did not do well. Skip-gram likely did not do well in an application for text documents because Skip-gram considers a shorter context and thus has less information available to it. The short context means that embeddings generated from it are a mix of syntactic and semantic information. Syntactic information is more useful for deep parsing, machine translation and sentiment relationships. Semantic information is more useful for document categorization, document-level sentiment, and role labeling. Longer contexts are more useful for semantic information. Further, skip-gram has no notion of sentence boundaries and went across boundaries when deciding what words influenced other words. On the other hand, embodiments herein using a tmCoocur action takes sentence boundaries into consideration.

Another thing that the tmCooccur action can do is to spot strongly cooccurring terms that can provide context to each other. Consider the following examples sentences:
 (1) I go for a run of at least two miles every day.
 (2) The play has had a very successful run.
 (3) He gave the reigning chess champion quite a run for his money.
 (4) If you would just shut the heck up, we can deal with this issue.
 (5) Please shut the door on the way out.
 (6) I didn't really like the movie very much.
 (7) I really like the movie a lot!

In the first three sentences, three different senses of the noun "run" are used; in the fourth and fifth sentences, the verb particle form "shut up" versus the plain verb "shut" should be distinguished; and in the last two sentences, the use of the "not" term, "didn't", in one sentence and not in the other causes the sentiment to be polar opposite.

In these cases, if a computing system can identify those important word relationships, then the computing system can treat each of these "pairs of words" as a single term. In this example, a threshold association score is set, and word pairs that exceed that score are identified. Then each such word pair forms a "virtual term"; that is, a virtual term is a word pair that has strong association and is denoted as "<term 1> . . . <term 2>" (for example, "run . . . mile" or "n't . . . like"). A computing system can then treat them as ordinary terms and use them for rule building, word embeddings, topic analysis, document categorization, etc.

This approach improved even the term-by-document SVD approach with parameters set so that order mattered (so that the term "run . . . mile" would mean that the word "run" preceded the word "mile" in the sentence), and a virtual term association cutoff was identified so that the number of virtual terms would equal the number of actual terms. Then term and document embeddings were generated and text categorization accuracy was computed.

Table 2450 shows the improvement to term-by-document SVD when considering virtual terms as described herein. The airline feedback data showed a huge advantage when including virtual terms as shown in with-virtual-terms column 2456 compared to without-virtual-terms column 2454. Based on other data not shown in Table 2450, it appears including virtual terms was useful particularly for sentiment analysis. Even in some situations in which virtual terms do not appear to give any additional lift in modeling or additional value in terms of accuracy, they did add descriptive value by including virtual terms in topic labels or by doing automatic rule generation and having the rules include virtual terms.

These examples were given in the context of textual information. However, embodiments herein are applicable to other data as described herein (e.g., computer-generated information or information with associated time information).

Figures 25A, 25B:
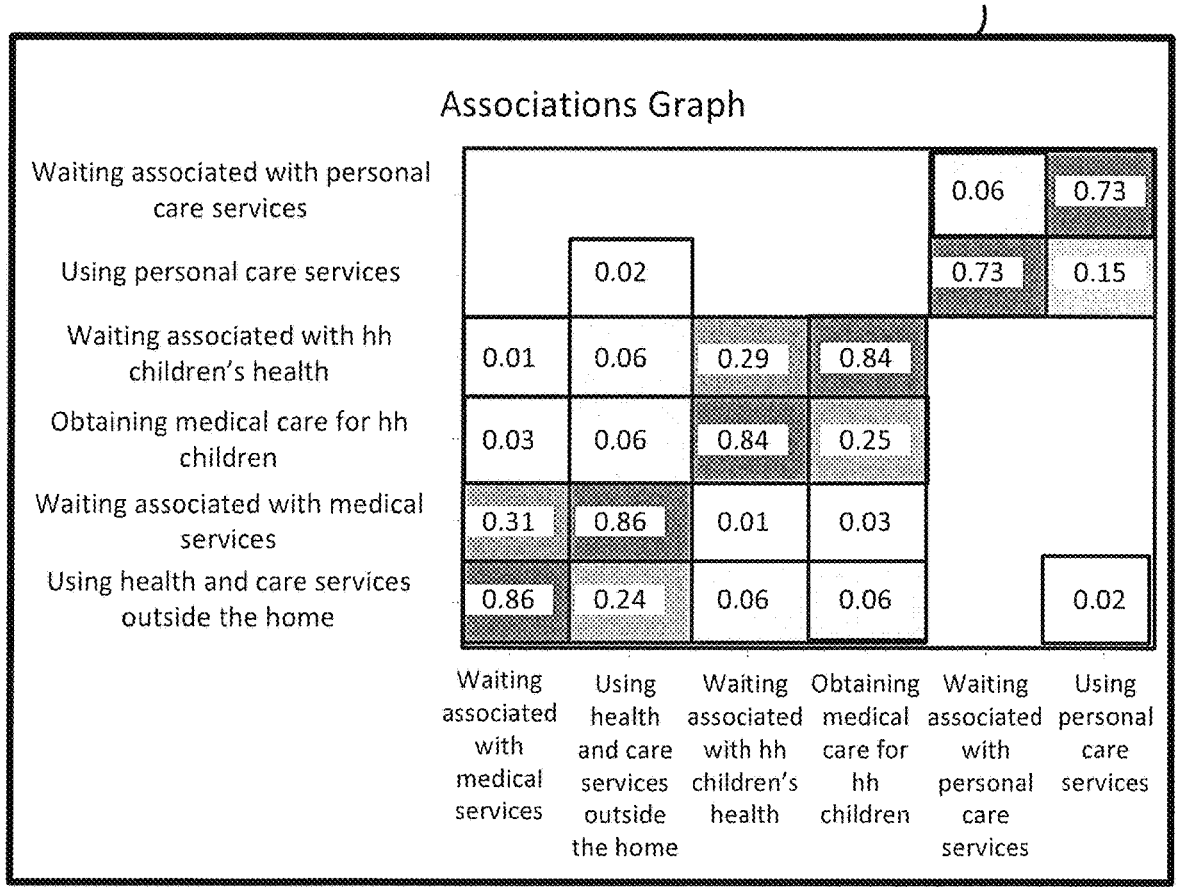
FIG. 25A illustrates text information with associated time information in at least one embodiment of the present technology.
FIG. 25B illustrates association indications in at least one embodiment of the present technology.

FIG. 25A illustrates text information with associated time information. The text information was gathered from an American Time Use Survey from the Bureau of Labor Statistics available at https://www.bls.gov/tus/. In this survey, users provided information about the various activities they participate in throughout the day such as eating, household activities, working, and driving. Responses are tied to a given person on a given day and are ordered based on the time and duration that they occurred. In this data, there are over 100,000 daily records and a total of over 500 distinct activities recorded. Table 2500 shows example data from a user's morning.

The individual's day of activities is analogous to a sentence context and each activity is analogous to a word in the sentence. Embodiments herein can aid in understanding the cooccurrence of different activities that a person engages in.

FIG. 25B illustrates association indications plotted in graph 2550. The association measures are plotted between activities with stronger associations shown in dark and having a higher value. The sequential pattern of "waiting associated with services" before "using health and care services outside the home" was picked up immediately in the association calculation (with a highest value of 0.86). In one or more embodiments, a computing system outputs plotted association measures to an output device for analysis by the computing system or user.

The SVD techniques described herein can be applied to the associations found in the survey responses. Each activity receives a vector representation derived from the data set. With these embeddings, it is possible to place the terms in a k-dimensional space and check for similarity. Table 1 below shows three activities and their nearest neighbors in that space. The similarity in this case is based on the context of the individual's day, and not necessarily functionally similar activities.

TABLE 1

| Activity | Nearest Activity |
|---|---|
| Sleeplessness | Using in-home health and care services |
| Interior Cleaning | Laundry |
| Email | Computer user for leisure (ex. Games) |

Figure 26:
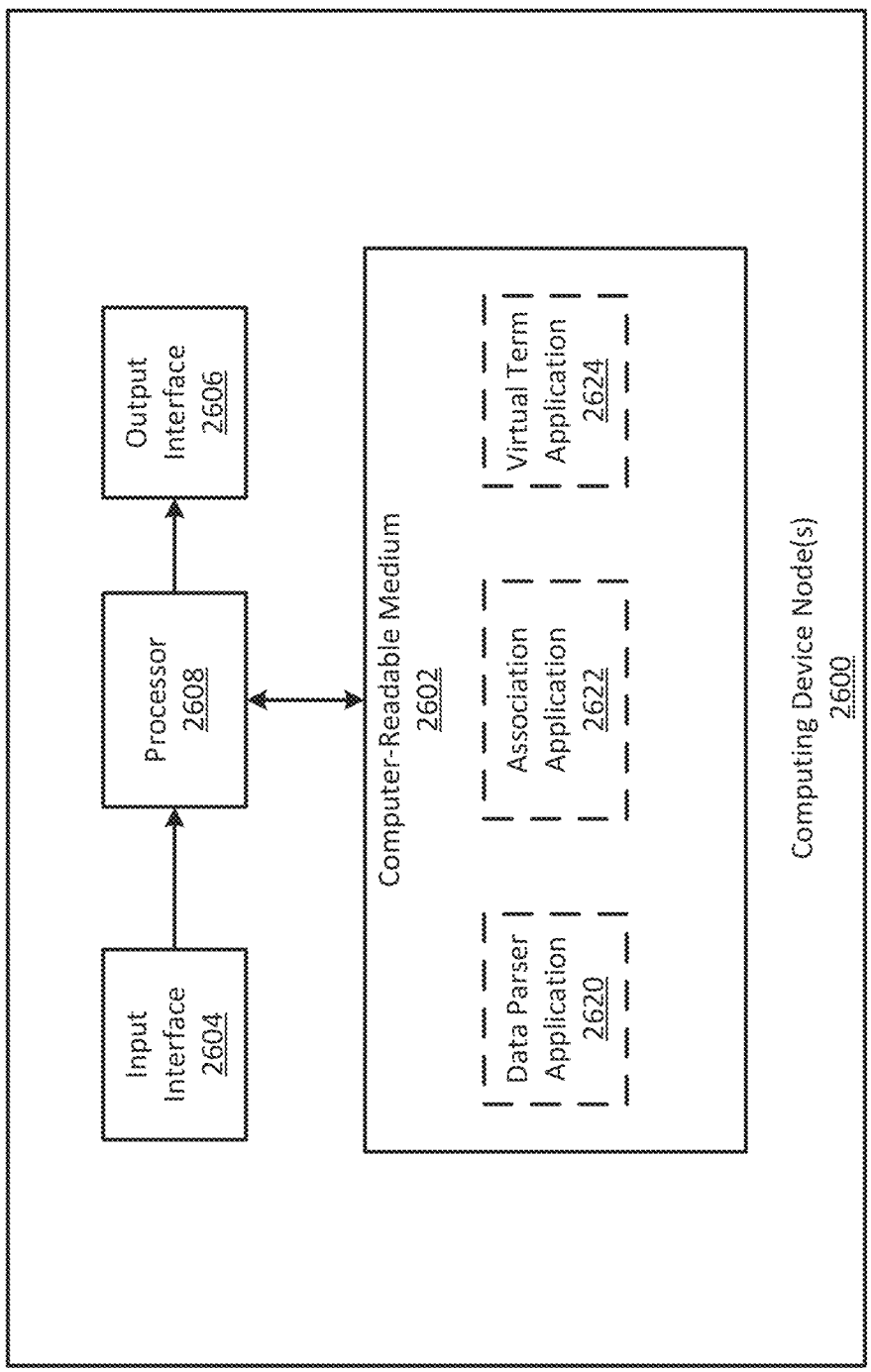
FIG. 26 illustrates a block diagram of a computing device node in at least one embodiment of the present technology.

FIG. 26 illustrates a block diagram of a computing device node 2600. In one or more embodiments, a node described herein (e.g., an input node 1302, a parsing node 1304, an association node 1306, a virtual term node 2002, or an output node 1308) or a combination of nodes described herein comprises one or more components of computing device node 2600. Computing device node 2600 is configured to exchange information with other computing device nodes or components of a system (e.g., computing system 1300 or computing system 2000). Computing device node 2600 comprises an input interface 2604 for receiving data and an output interface 2606 for outputting data (e.g., input data 1310, dataset 2010, possible terms 1320, collection 1350, association indication 1360, virtual term indication 2040, virtual term feature 2030, settings 1370). The input interface 2604 and output interface 2606 could comprise multiple interfaces or could be combined into a single interface.

Computing device node 2600 comprises computer-readable medium 2602, which is an electronic holding place or storage for information so the information can be accessed by processor (e.g., processor 2608). Computer-readable medium 2602 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Computing device node 2600 comprises a processor 2608 that executes instructions (e.g., stored at the computer-readable medium 2602). The instructions can be carried out by a special purpose computer, logic circuits, or hardware circuits. In one or more embodiments, processor 2608 is implemented in hardware and/or firmware. Processor 2608 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 2608 operably couples with input interface 2604, with output interface 2606 and with computer-readable medium 2602 to receive, to send, and to process information. Processor 2608 in one or more embodiments can retrieve a set of instructions from a permanent memory device and copy the instructions in an executable form to a temporary memory device that is generally some form of RAM.

In one or more embodiments, computer-readable medium 2602 stores instructions for execution by processor 2608 to cause a computing node or system to carry out embodiments described herein. For example, computer-readable medium 2602 could comprise instructions for data parser application 2620 for parsing data (e.g., text information) for identifying terms; an association application 2622 for determining association measures as described herein, and a virtual term application 2624 for generating virtual terms and indicating to include virtual terms as described herein. In other embodiments, fewer, different, or additional applications can be stored in computer-readable medium 2602.

In one or more embodiments, one or more applications stored on computer-readable medium 2602 are implemented in software (e.g., computer-readable and/or computer-executable instructions) stored in computer-readable medium 2602 and accessible by processor 2608 for execution of the instructions. The applications can be written using one or more programming languages, assembly languages, scripting languages, etc. The one or more application can be integrated with other data analytics software application and/or software architecture such as that offered by SAS Institute Inc. of Cary, N.C., USA as described herein.

In other embodiments, fewer, different, and additional components can be incorporated into computing device node 2600.

One or more embodiments herein represent improvements over traditional approaches for determining association measures. For instance, one or more embodiments use additive smoothing by combining conditional probabilities as input to NPMI. Embodiments also shift values by a variable value such that missing association measures are true zeros.

Further, other approaches to determining association measures are not well suited for applications related to sentences that might be very long and of variable length. Other approaches that use local co-occurrence information use fixed-width word "windows" as opposed to sentences (e.g., skip-gram models). Fixed-width word windows ignored sentence boundaries and do not address situations where the words could be very far apart, in the case of long sentences. Embodiments use a unique weighting not found in other approaches. They are also better suited for repeated words that are more common in longer contexts like the length of a sentence. Embodiments herein also generate virtual terms that may better account for multi-word expressions present in sentence contexts.

Additionally, one or more embodiments represent improvements on terms including virtual terms or composite terms that can be used to create better topic, concept, and category definitions. Doing so can generate significant gains in lift for predictive modeling.

What is claimed is:

1. A computer-program product tangibly embodied in a non-transitory machine-readable storage medium, the computer-program product including instructions operable to cause a computing system to:
   receive a dataset comprising a dictionary set of candidate terms, the dataset for computer identification of one or more of the candidate terms in data comprising ordered terms;
   obtain computer-generated association measures, wherein each association measure of the computer-generated association measures is an association between a pair of terms from a plurality of identified terms of the candidate terms that were identified in the data, wherein the identified terms comprise a first term and a second term;
   based on one or more of the obtained computer-generated association measures, generate by the computing system a virtual term, wherein the virtual term comprises a single term that specifies the first term and the second term that co-occur a variable distance apart; and
   output an indication to include the virtual term in the dataset for computer identification of at least one term additional to the dictionary set of candidate terms, wherein the computer identification of the at least one term additional to the dictionary set of candidate terms comprises computer identification according to a computer model trained based on the dataset augmented to include the virtual term.

2. The computer-program product of claim 1, wherein the instructions are operable to cause a computing system to:
   receive a parameter indicating a ratio of a number of the candidate terms to a number of allowed virtual terms;
   generate, based on the obtained computer-generated association measures, a plurality of virtual terms that exceeds the number of allowed virtual terms; and
   select a subset of the plurality of virtual terms, wherein the subset comprises a number of selected virtual terms that is equal to or less than the number of allowed virtual terms.

3. The computer-program product of claim 2, wherein the instructions are operable to cause a computing system to:
   compare the computer-generated association measures; and
   select the subset based on the comparison.

4. The computer-program product of claim 1, wherein the instructions are operable to cause a computing system to:
   generate, based on the obtained computer-generated association measures, a plurality of virtual terms;
   receive a target variable for a supervised machine learning algorithm;
   execute the supervised machine learning algorithm to select, based on the target variable, a subset of the plurality of virtual terms, wherein the subset comprises the virtual term; and
   output the indication to include the subset in the dataset of candidate terms.

5. The computer-program product of claim 1, wherein the instructions are operable to cause a computing system to:

generate, based on the obtained computer-generated association measures, a plurality of virtual terms;

determine correlations between individual virtual terms of the plurality of virtual terms and predefined topics;

select a subset of the plurality of virtual terms based on the correlations, wherein the subset comprises the virtual term; and output an indication to include the subset in the dataset of candidate terms.

6. The computer-program product of claim 1, wherein the instructions are operable to cause a computing system to output the indication by:

comparing the computer-generated association measures of a plurality of generated virtual terms to a threshold; and selecting virtual terms of the plurality of generated virtual terms that exceed the threshold.

7. The computer-program product of claim 1, wherein the instructions are operable to cause a computing system to output the indication to include the virtual term in the dataset of candidate terms by:

outputting a generated dataset comprising the candidate terms and the virtual term; or appending the virtual term to the dataset of candidate terms to generate the generated dataset.

8. The computer-program product of claim 7, wherein the instructions are operable to cause a computing system to:

generate one or more features for the virtual term, wherein a given feature of the one or more features indicates a correlation with a topic, category, sentiment or meaning of one of predefined candidate options;

receive new data subsequent to the data comprising the ordered terms, the new data comprising one or more different terms or a different term ordering than the data comprising the ordered terms, identify the virtual term in the new data according to the generated dataset; and identify one or more features about the new data based on the one or more features for the virtual term.

9. The computer-program product of claim 7, wherein the virtual term specifies an initial virtual term and another term of the generated dataset that co-occurs in the data a variable distance apart; and wherein the computer-generated association measures comprise a computer-generated association measure of an association between the initial virtual term and the another term of the generated dataset.

10. The computer-program product of claim 1, wherein the virtual term specifies more than two terms that co-occur in the data.

11. The computer-program product of claim 1, wherein the virtual term specifies an ordering for the first term and the second term.

12. The computer-program product of claim 1, wherein the virtual term specifies a maximum distance between the first term and the second term.

13. The computer-program product of claim 1, wherein the first term or the second term indicates a plurality of terms of the same stem.

14. The computer-program product of claim 1, wherein the data represents text information; and wherein the computer-generated association measures are a measure of association between each of pairs of the plurality of identified terms of the candidate terms that were identified within a sentence of the data.

15. The computer-program product of claim 1, wherein the computer-generated association measures are based on a frequency of co-occurrence of each pair of identified terms of the candidate terms that were identified in the data and a variable weighting based on a distance between terms of a respective pair of the plurality of identified terms.

16. The computer-program product of claim 1, wherein the instructions are operable to cause a computing system to generate a virtual term by:

receiving, from a user of the computing system, a user identification of the first term;

displaying, on a display device, options for the virtual term, wherein the options comprise the second term; and receiving, from the user of the computing system, a user selection of the second term.

17. A computer-implemented method comprising:

receiving a dataset comprising a dictionary set of candidate terms, the dataset for computer identification of one or more of the candidate terms in data comprising ordered terms;

obtaining computer-generated association measures, wherein each association measure of the computer-generated association measures is an association between a pair of terms from a plurality of identified terms of the candidate terms that were identified in the data, wherein the identified terms comprise a first term and a second term;

based on one or more of the obtained computer-generated association measures, generating a virtual term, wherein the virtual term comprises a single term that specifies the first term and the second term that co-occur a variable distance apart; and outputting an indication to include the virtual term in the dataset for computer identification of at least one term additional to the dictionary set of candidate terms, wherein the computer identification of the at least one term additional to the dictionary set of candidate terms comprises computer identification according to a computer model trained based on the dataset augmented to include the virtual term.

18. The computer-implemented method of claim 17, wherein the computer-implemented method further comprises:

receiving a parameter indicating a ratio of a number of the candidate terms to a number of allowed virtual terms;

generating, based on the obtained computer-generated association measures, a plurality of virtual terms that exceeds the number of allowed virtual terms; and selecting a subset of the plurality of virtual terms, wherein the subset comprises a number of selected virtual terms that is equal to or less than the number of allowed virtual terms.

19. The computer-implemented method of claim 18, wherein the computer-implemented method further comprises:

comparing the computer-generated association measures; and selecting the subset based on the comparison.

20. The computer-implemented method of claim 17, wherein the computer-implemented method further comprises:

generating, based on the obtained computer-generated association measures, a plurality of virtual terms;

receiving a target variable for a supervised machine learning algorithm;

executing the supervised machine learning algorithm to select, based on the target variable, a subset of the plurality of virtual terms, wherein the subset comprises the virtual term; and outputting the indication to include the subset in the dataset of candidate terms.

21. The computer-implemented method of claim 17, wherein the computer-implemented method further comprises:

generating, based on the obtained computer-generated association measures, a plurality of virtual terms;

determining correlations between individual virtual terms of the plurality of virtual terms and predefined topics;

selecting a subset of the plurality of virtual terms based on the correlations, wherein the subset comprises the virtual term; and outputting an indication to include the subset in the dataset of candidate terms.

22. The computer-implemented method of claim 17, wherein the outputting the indication comprises:

comparing the computer-generated association measures of a plurality of generated virtual terms to a threshold; and selecting virtual terms of the plurality of generated virtual terms that exceed the threshold.

23. The computer-implemented method of claim 17, wherein the outputting the indication comprises including the virtual term in the dataset of candidate terms by:

outputting a generated dataset comprising the candidate terms and the virtual term; or appending the virtual term to the dataset of candidate terms to generate the generated dataset.

24. The computer-implemented method of claim 23, wherein the computer-implemented method further comprises:

generating one or more features for the virtual term, wherein a given feature of the one or more features indicates a correlation with a topic, category, sentiment or meaning of one of predefined candidate options;

receiving new data subsequent to the data comprising the ordered terms, the new data comprising one or more different terms or a different term ordering than the data comprising the ordered terms, identifying the virtual term in the new data according to the generated dataset; and identifying one or more features about the new data based on the one or more features for the virtual term.

25. The computer-implemented method of claim 23, wherein the virtual term specifies an initial virtual term and another term of the generated dataset that co-occurs in the data a variable distance apart; and wherein the computer-generated association measures comprises a computer-generated association measure of an association between the initial virtual term and the another term of the generated dataset.

26. The computer-implemented method of claim 17, wherein the data represents text information; and wherein the computer-generated association measures are a measure of association between each of pairs of the plurality of identified terms of the candidate terms that were identified within a sentence of the data.

27. The computer-implemented method of claim 17, wherein the computer-generated association measures are based on a frequency of co-occurrence of each pair of the identified terms of the candidate terms that were identified in the data and a variable weighting based on a distance between terms of a respective pair of the plurality of identified terms.

28. The computer-implemented method of claim 17, wherein the computer-implemented method further comprises generating a virtual term by:

receiving, from a user of the computing system, a user identification of the first term;

displaying, on a display device, options for the virtual term, wherein the options comprise the second term; and receiving, from the user of the computing system, a user selection of the second term.

29. The computer-implemented method of claim 17, wherein the virtual term specifies one or more of:

an ordering for the first term and the second term;

a maximum distance between the first term and the second term; and more than two terms that co-occur in the data.

30. A computing system comprising processor and memory, the memory containing instructions executable by the processor wherein the computing system is configured to:

receive a dataset comprising a dictionary set of candidate terms, the dataset for computer identification of one or more of the candidate terms in data comprising ordered terms;

obtain computer-generated association measures, wherein each association measure of the computer-generated association measures is an association between a pair of terms from a plurality of identified terms of the candidate terms that were identified in the data, wherein the identified terms comprise a first term and a second term;

based on one or more of the obtained computer-generated association measures, generate a virtual term, wherein the virtual term comprises a single term that specifies the first term and the second term that co-occur a variable distance apart; and output an indication to include the virtual term in the dataset for computer identification of at least one term additional to the dictionary set of candidate terms, wherein the computer identification of the at least one term additional to the dictionary set of candidate terms comprises computer identification according to a computer model trained based on the dataset augmented to include the virtual term.

* * * * *